United States Patent
Wang et al.

(10) Patent No.: US 12,469,569 B2
(45) Date of Patent: *Nov. 11, 2025

(54) SMART ERASE INHIBIT

(71) Applicant: Sandisk Technologies, Inc., Milpitas, CA (US)

(72) Inventors: Ming Wang, Shanghai (CN); Liang Li, Shanghai (CN); Wei Li, Shanghai (CN)

(73) Assignee: Sandisk Technologies, Inc., Milpitas, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 18/519,426

(22) Filed: Nov. 27, 2023

(65) Prior Publication Data

US 2025/0174286 A1 May 29, 2025

(51) Int. Cl.
*G11C 16/34* (2006.01)
*G11C 16/04* (2006.01)
*G11C 16/14* (2006.01)
*G11C 16/16* (2006.01)
*G11C 16/24* (2006.01)

(52) U.S. Cl.
CPC ...... *G11C 16/3445* (2013.01); *G11C 16/0433* (2013.01); *G11C 16/0483* (2013.01); *G11C 16/14* (2013.01); *G11C 16/16* (2013.01); *G11C 16/24* (2013.01)

(58) Field of Classification Search
CPC . G11C 16/3445; G11C 16/0433; G11C 16/14; G11C 16/24; G11C 16/0483; G11C 16/16
See application file for complete search history.

(56) References Cited

U.S. PATENT DOCUMENTS

| | | | |
|---|---|---|---|
| 7,558,122 B2 | 7/2009 | Kim et al. | |
| 7,668,019 B2 | 2/2010 | Byeon | |
| 8,130,551 B2 | 3/2012 | Oowada et al. | |
| 8,339,864 B2 * | 12/2012 | Park | G11C 16/3445 365/185.28 |
| 8,830,756 B2 | 9/2014 | Mu et al. | |
| 9,019,775 B2 | 4/2015 | Costa et al. | |
| 9,224,494 B2 * | 12/2015 | Chin | G11C 16/16 |
| 9,595,344 B2 | 3/2017 | Shibata | |
| 9,818,485 B2 | 11/2017 | Oh et al. | |
| 10,796,777 B1 * | 10/2020 | Li | G11C 16/10 |
| 10,923,197 B2 * | 2/2021 | Lu | H10B 43/35 |
| 11,355,198 B1 | 6/2022 | Wu et al. | |
| 11,551,765 B2 | 1/2023 | Yang et al. | |
| 2016/0276032 A1 * | 9/2016 | Shiga | H10B 41/35 |
| 2020/0411105 A1 * | 12/2020 | Lee | G11C 16/3445 |
| 2024/0047001 A1 * | 2/2024 | Shibata | G11C 16/14 |
| 2024/0319905 A1 * | 9/2024 | Liu | G06F 3/0652 |
| 2025/0046380 A1 * | 2/2025 | Chen | G11C 11/5635 |
| 2025/0266109 A1 * | 8/2025 | Wang | G11C 16/24 |

* cited by examiner

Primary Examiner — Amir Zarabian
Assistant Examiner — Justin Bryce Heisterkamp
(74) Attorney, Agent, or Firm — Pearl Cohen Zedek Latzer Baratz LLP

(57) ABSTRACT

Technology to prevent over-erase in NAND memory. Each bit line involved in erase is connected to multiple NAND strings. Erase verify of each NAND string is performed at a final target level and a level that is somewhat higher than the final target level. Bit lines are placed into three groups based on the erase status of the NAND strings connected to the bit line. The erase voltage applied to the bit lines in the next erase loop depends on the group in which the bit line was placed.

20 Claims, 19 Drawing Sheets

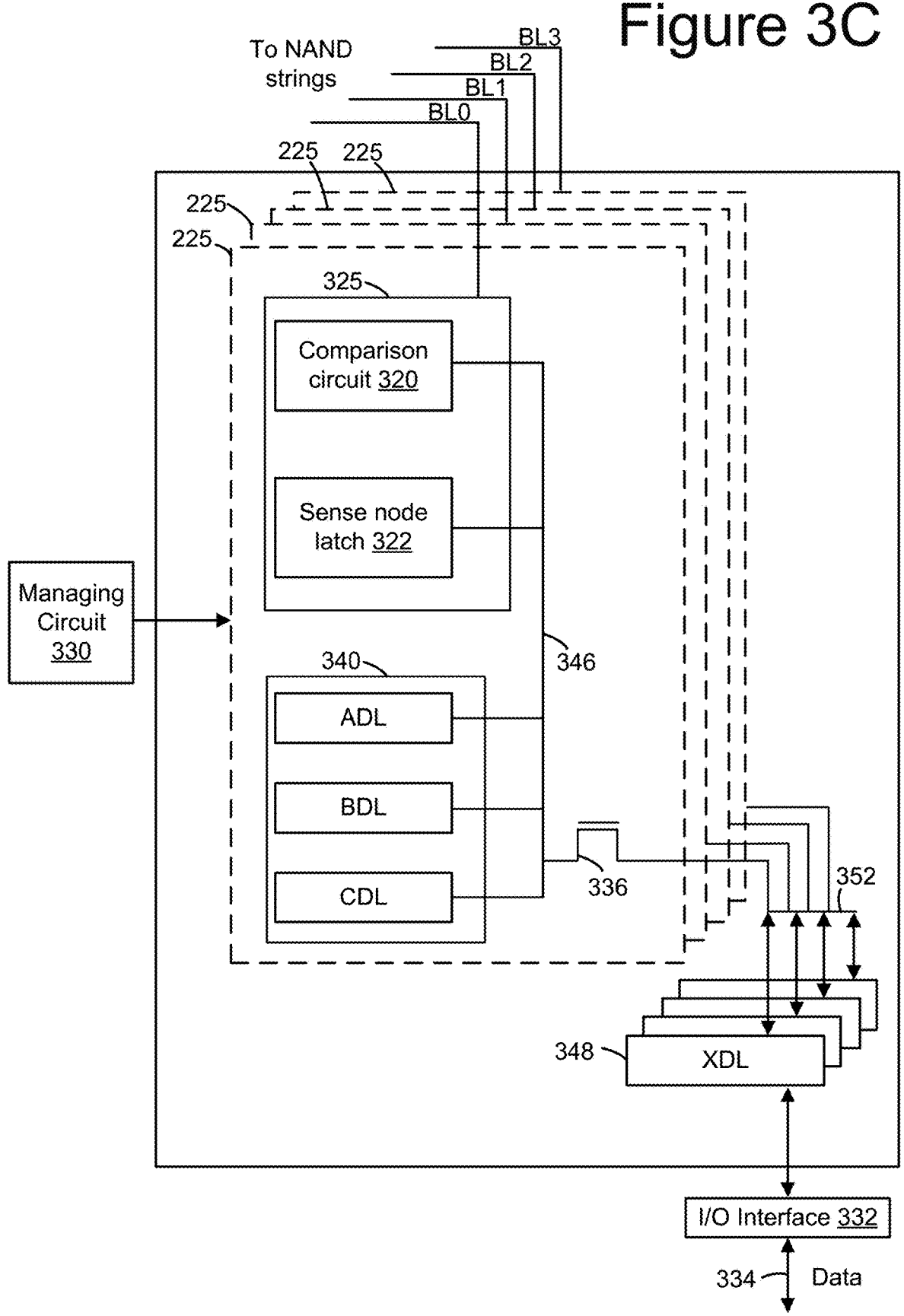

Figure 6
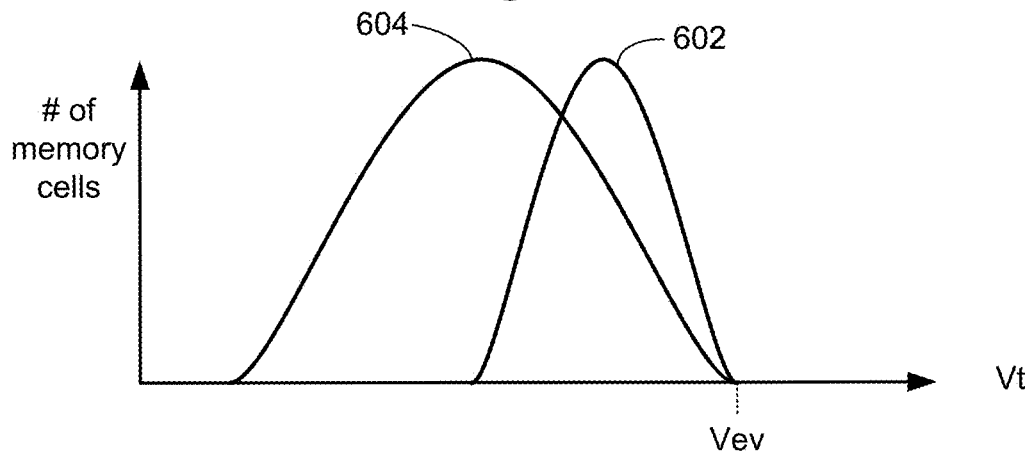
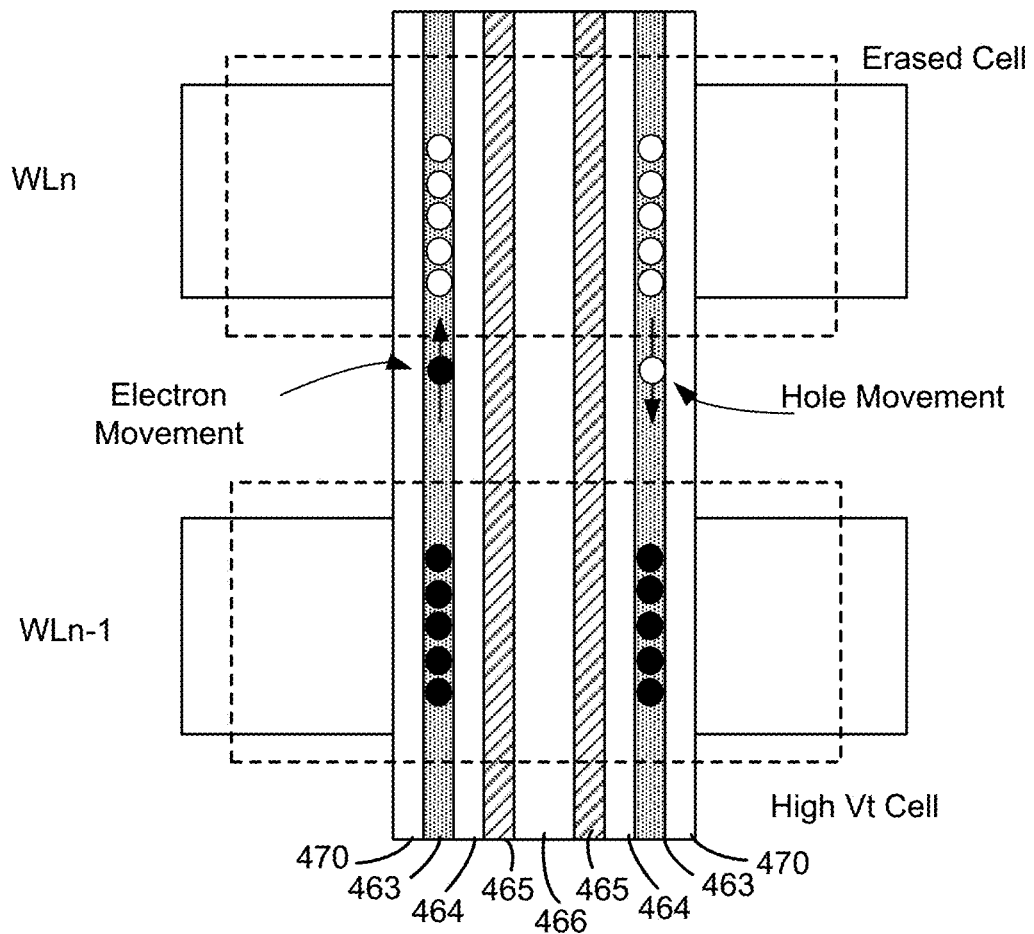
FIG. 7

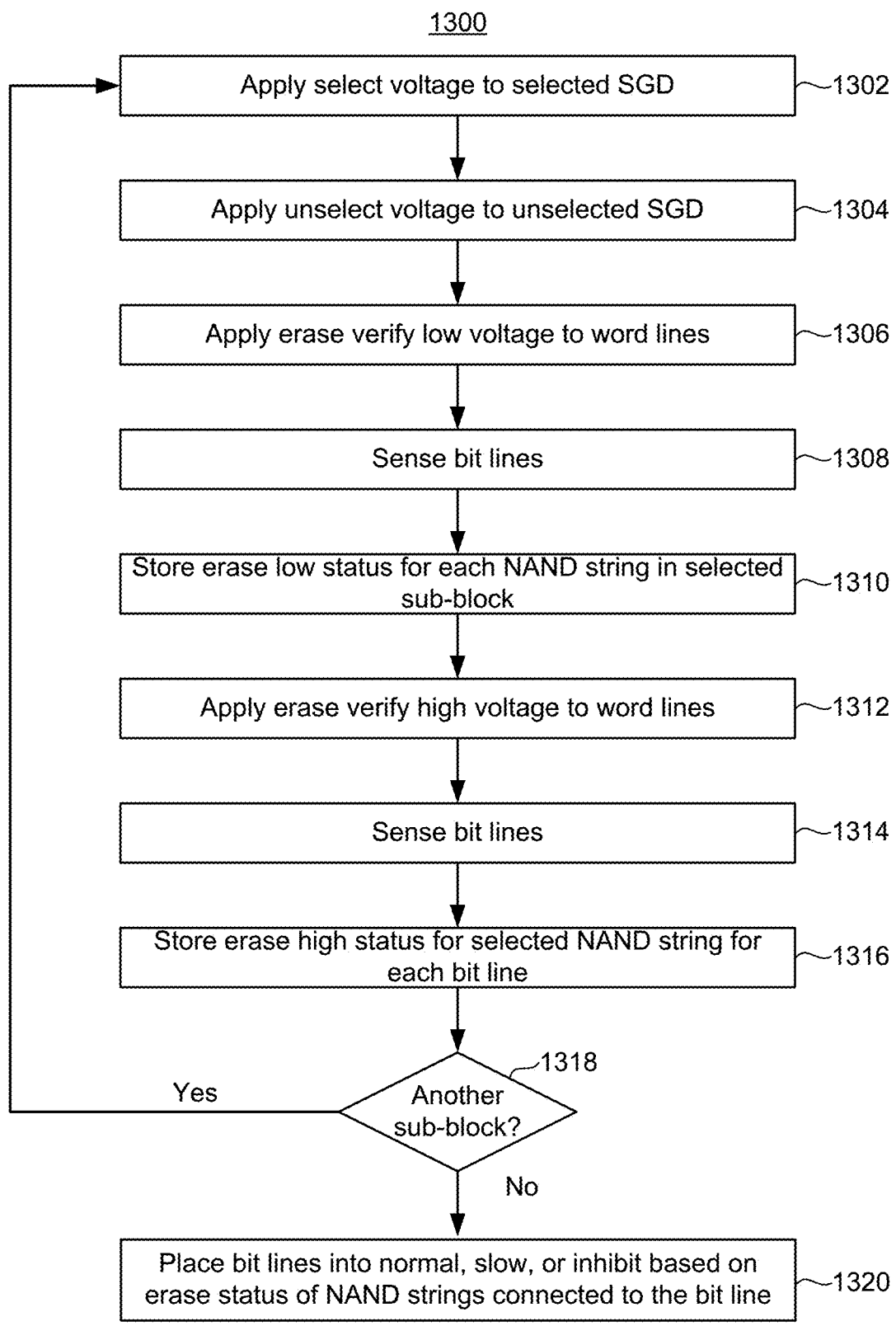

SMART ERASE INHIBIT

BACKGROUND

The present disclosure relates to non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

A memory structure in the memory system typically contains many memory cells and various control lines. Herein, a memory system that uses non-volatile memory for storage may be referred to as a storage system. The memory structure may be three-dimensional (3D). One type of 3D structure has non-volatile memory cells arranged as vertical NAND strings. The 3D memory structure may be arranged into units that are commonly referred to as physical blocks. For example, a physical block in a NAND memory system contains many NAND strings. A NAND string contains memory cell transistors connected in series, a drain side select gate at one end, and a source side select gate at the other end. Each NAND string is associated with a bit line. The physical block typically has many word lines that provide voltages to the control gates of the memory cell transistors. In some architectures, each word line connects to the control gate of one memory cell on each respective NAND string in the physical block.

The memory cells are programmed one group at a time. The unit of programming is typically referred to as a page. Typically, the memory cells are programmed to a number of data states. Using a greater number of data states allows for more bits to be stored per memory cell. For example, four data states may be used to store two bits per memory cell, eight data states may be used in order to store three bits per memory cell, 16 data states may be used to store four bits per memory cell, etc. Some memory cells may be programmed to a data state by storing charge in the memory cell. For example, the threshold voltage (Vt) of a NAND memory cell can be set to a target Vt by programming charge into a charge storage region such as a charge trapping layer. The amount of charge stored in the charge trapping layer establishes the Vt of the memory cell.

One type of three-dimensional memory structure has alternating dielectric layers and conductive layers in a stack. NAND strings are formed vertically in the alternating dielectric layers and conductive layers in what may be referred to as memory holes. For example, after memory holes are drilled into the stack of alternating dielectric layers and conductive layers, the memory holes are filled in with layers of materials including a charge-trapping material to create a vertical column of memory cells (e.g., NAND string). The semiconductor fabrication process for forming a three-dimensional memory structure may result in location dependent physical differences between similar structures.

For memory such as NAND, a large set of memory cells are erased prior to programming. In some cases, the memory cells of an entire physical block are erased as a group. In some cases, the memory cells of a portion of a physical block are erased as a group. Erasing typically includes a number of erase loops, with each loop including applying an erase pulse and then verifying whether erase is complete. If different NAND strings erase at different speeds then it is possible that the NAND strings that are faster to erase will be "over-erased". Over-erase of NAND strings can damage the memory cells. Over-erase of NAND strings can result in data integrity issues.

BRIEF DESCRIPTION OF THE DRAWINGS

Like-numbered elements refer to common components in the different figures.

FIG. 3C is a block diagram depicting one embodiment of a portion of column control circuitry that contains a number of read/write circuits.

FIG. 6 shows two Vt distributions following erase of memory cells.

FIG. 7 graphically depicts a possible explanation of lateral data retention issue that may arise due to over-erase of memory cells.

FIG. 13 is a flowchart of one embodiment of a process that shows further details of placing bit lines into different erase groups.

DETAILED DESCRIPTION

Technology is disclosed for a storage system that prevents over-erase of NAND strings. In one embodiment, each bit line involved in erase is connected to multiple NAND strings. For example, a block having NAND strings may be divided into multiple sub-blocks with each sub-block containing a large number of NAND strings. Each bit line may be connected to one NAND string in each sub-block. In one embodiment, the storage system will perform an erase verify of each NAND string at a final target level and a level that is somewhat higher than the final target level. The erase verify may thus determine whether a NAND string is erased (threshold voltage (Vt) is under the final target erase verify level), close to being erased (NAND string Vt is between the final target level and the somewhat higher erase verify level) or still relatively far from being erased (Vt is over the higher erase verify level). The storage system will then place the bit lines into three groups based on the erase status of the NAND strings connected to the bit line. In an embodiment, if at least one NAND string connected to a bit line has a Vt above the higher erase verify level then the bit line is placed in a normal erase group; if all NAND strings connected to a bit line have a Vt below the final target erase verify level then the bit line is placed in an erase inhibit group; and if all NAND strings connected to a bit line have a Vt below the higher erase verify level but at least one NAND string has Vt above the final target erase verify level then the bit line is placed in a slow erase group. The erase voltage applied to the bit lines in the next erase loop depends on the group in which the bit line was placed. For the bit lines in the normal erase group a voltage is applied to the bit lines that erases NAND strings at a normal speed; however, for the bit lines in the slow erase group a voltage is applied to the bit lines that erases NAND strings at a slower than normal speed that thereby prevents over-erase. The bit lines in the inhibit group have an erase inhibit voltage applied thereto in order to inhibit erase in the memory cells on NAND strings connected to the bit lines in the inhibit group.

Figure 1:
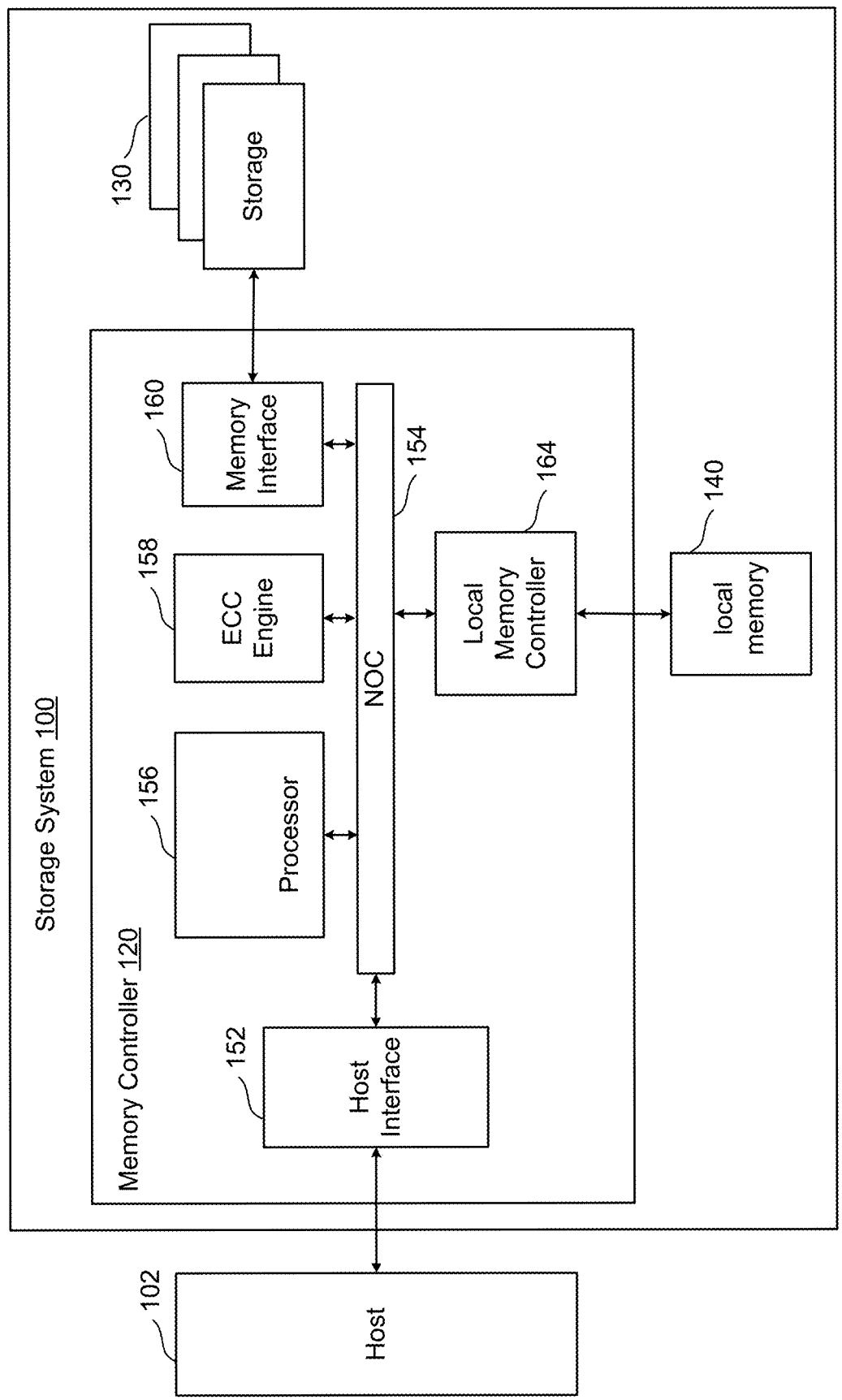
FIG. 1 is a block diagram depicting one embodiment of a storage system.

FIG. 1 is a block diagram of one embodiment of a storage system 100 that implements the technology described herein. In one embodiment, storage system 100 prevents over-erase of NAND strings in the storage 130. In one embodiment, storage system 100 is a solid state drive ("SSD"). Storage system 100 can also be a memory card, USB drive or other type of storage system. The proposed technology is not limited to any one type of storage system. Storage system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, storage system 100. In other embodiments, storage system 100 is embedded within host 102.

The components of storage system 100 depicted in FIG. 1 are electrical circuits. Storage system 100 includes a memory controller 120 (or storage controller) connected to non-volatile storage 130 and local high speed memory 140 (e.g., DRAM, SRAM, MRAM). Local memory 140 is non-transitory memory, which may include volatile memory or non-volatile memory. Local high speed memory 140 is used by memory controller 120 to perform certain operations. For example, local high speed memory 140 may store logical to physical address translation tables ("L2P tables").

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and local memory controller 164. Local memory controller 164 is used to operate and communicate with local high speed memory 140 (e.g., DRAM, SRAM, MRAM).

ECC engine 158 performs error correction services. For example, ECC engine 158 performs data encoding and decoding. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 120 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a storage 130 and a subset of the L2P tables are cached (L2P cache) in the local high speed memory 140.

Memory interface 160 communicates with non-volatile storage 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 2A:
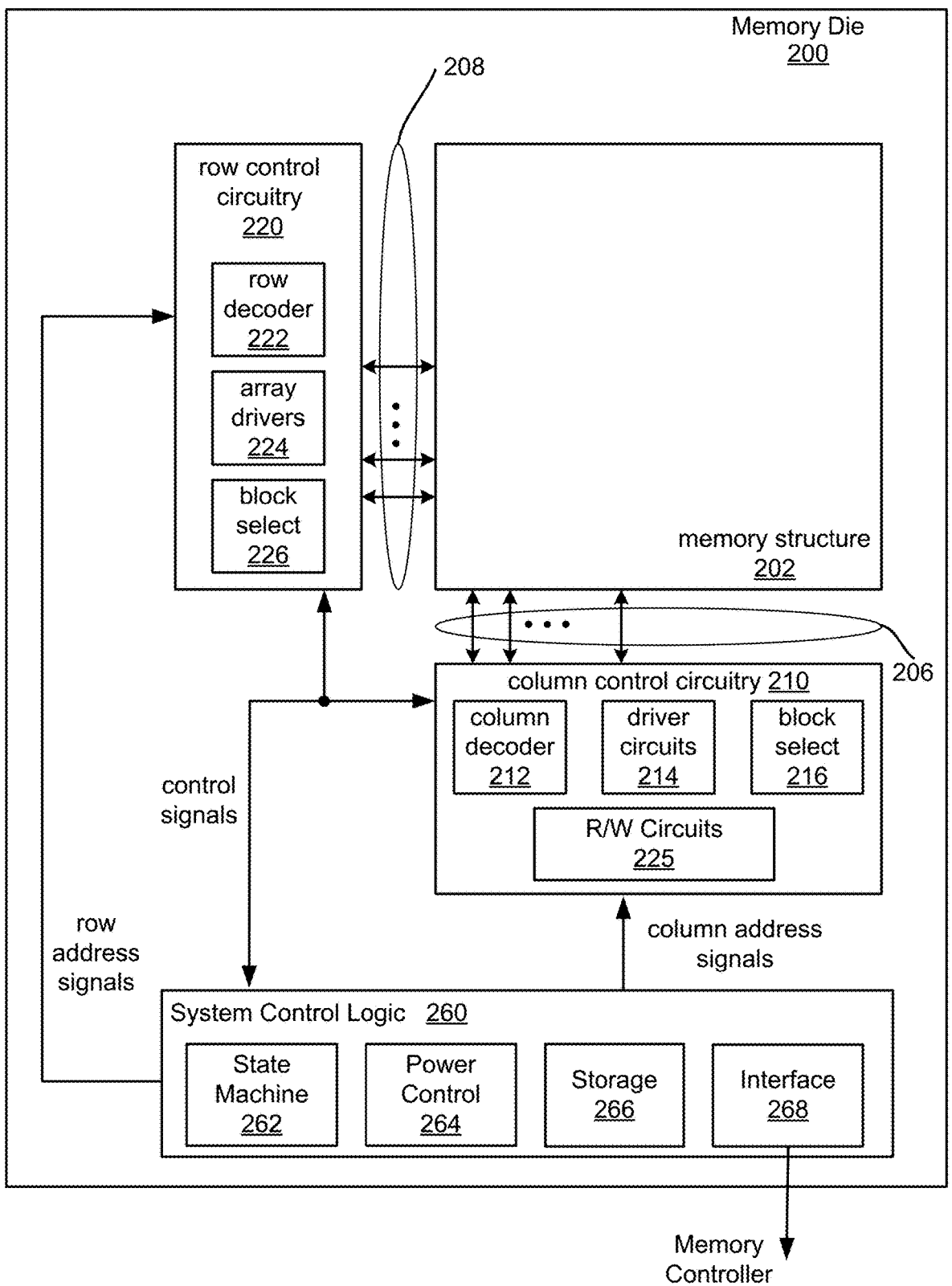
FIG. 2A is a block diagram of one embodiment of a memory die.

In one embodiment, non-volatile storage 130 comprises one or more memory dies. FIG. 2A is a functional block diagram of one embodiment of a memory die 200 that comprises non-volatile storage 130. Each of the one or more memory dies of non-volatile storage 130 can be implemented as memory die 200 of FIG. 2A. The components depicted in FIG. 2A are electrical circuits. Memory die 200 includes a memory structure 202 (e.g., memory array) that can comprise non-volatile memory cells (also referred to as non-volatile storage cells), as described in more detail below. The array terminal lines of memory structure 202 include the various layer(s) of word lines organized as rows, and the various layer(s) of bit lines organized as columns. However, other orientations can also be implemented. Memory die 200 includes row control circuitry 220, whose outputs are connected to respective word lines of the memory structure 202. Row control circuitry 220 receives a group of M row address signals and one or more various control signals from System Control Logic circuit 260, and typically may include such circuits as row decoders 222, array drivers 224, and block select circuitry 226 for both reading and writing (programming) operations. Row control circuitry 220 may also include read/write circuitry. Memory die 200 also includes column control circuitry 210 including read/write circuits 225. The read/write circuits 225 may contain sense amplifiers and data latches. The sense amplifier(s) input/outputs are connected to respective bit lines of the memory structure 202. Although only single block is shown for structure 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, block select circuitry 216, as well as read/write circuitry, and I/O multiplexers. The system control logic 260, column control circuitry 210, and/or row control circuitry 220 are configured to control memory operations such as open block reads at the die level.

System control logic 260 receives data and commands from memory controller 120 and provides output data and status to the host. In some embodiments, the system control logic 260 (which comprises one or more electrical circuits) includes state machine 262 that provides die-level control of memory operations. In some embodiments, the state machine 262 prevents over-erase of NAND strings in the memory structure 202. State machine 262 may control process 900, 1100, and/or 1300 (see FIGS. 9, 11, 13) to prevent over-erase of NAND strings in the memory structure 202. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations. System control logic 260 includes storage 266 (e.g., RAM, registers, latches, etc.), which may be used to store parameters for operating the memory structure 202.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used.

In some embodiments, all the elements of memory die 200, including the system control logic 260, can be formed as part of a single die. In other embodiments, some or all of the system control logic 260 can be formed on a different die than the die that contains the memory structure 202.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 202 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the other components depicted in FIG. 2A. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies. Three-dimensional NAND structures (see, for example, FIG. 4) in particular may benefit from specialized processing operations.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more dies, such as two memory dies and one control die, for example.

Figure 2B:
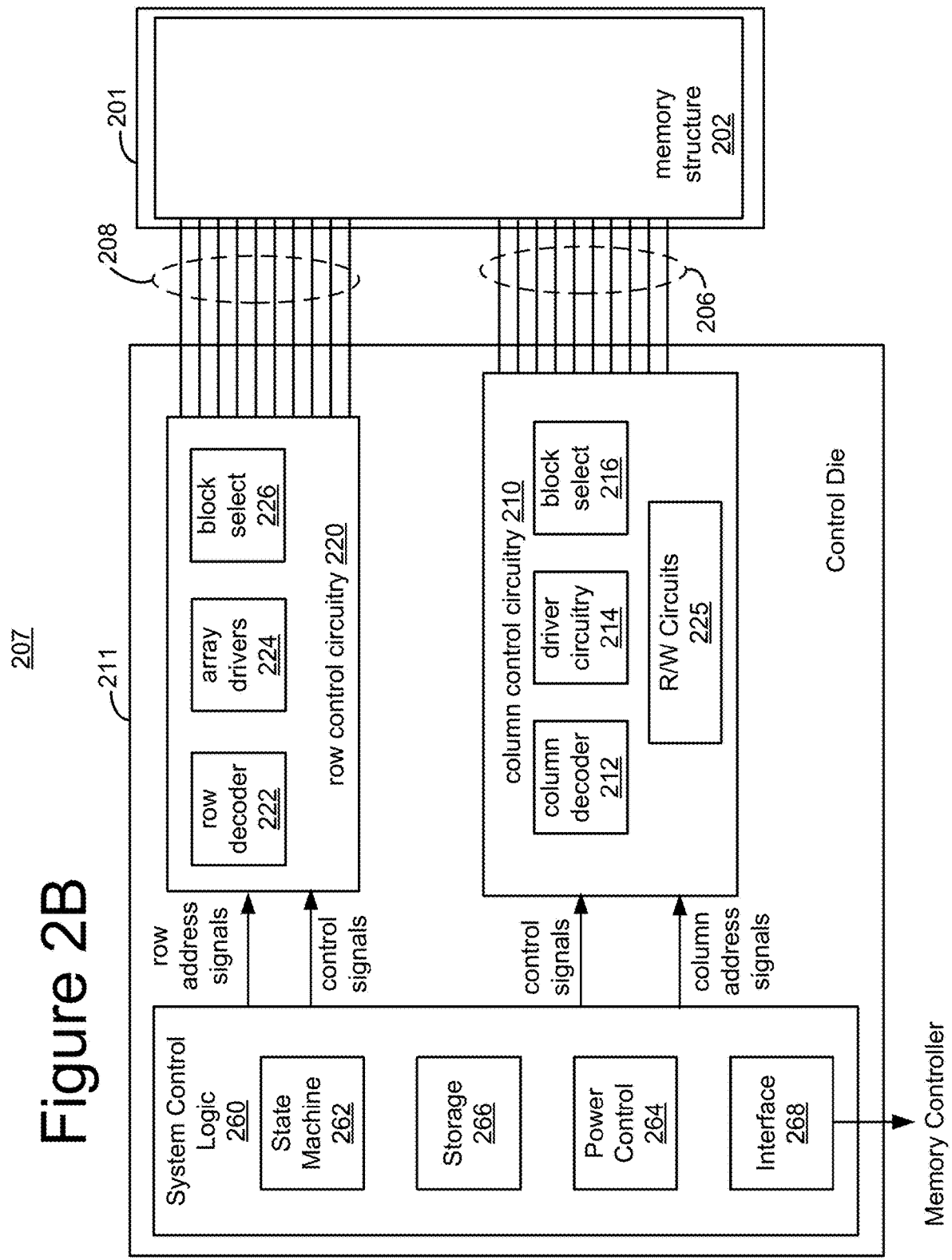
FIG. 2B is a block diagram of one embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement the non-volatile storage 130 of storage system 100. The integrated memory assembly 207 includes two types of semiconductor dies (or more succinctly, "die"). Memory structure die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory structure die 201. In some embodiments, the memory structure die 201 and the control die 211 are bonded together.

FIG. 2B shows an example of the peripheral circuitry, including control circuits, formed in a peripheral circuit or control die 211 coupled to memory structure 202 formed in memory structure die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory structure die 201. In some embodiments, some of the circuitry in the system control logic 260 is located on the on the memory structure die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory structure die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2B shows column control circuitry 210 including read/write circuits 225 on the control die 211 coupled to memory structure 202 on the memory structure die 201 through electrical paths 206. For example, electrical paths 206 may provide electrical connection between column decoder 212, driver circuitry 214, and block select 216 and bit lines of memory structure 202. Electrical paths may extend from column control circuitry 210 in control die 211 through pads on control die 211 that are bonded to corresponding pads of the memory structure die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each electrical path 208 may correspond to a word line, dummy word line, or select gate line. Additional electrical paths may also be provided between control die 211 and memory structure die 201.

For purposes of this document, the phrases "a control circuit" or "one or more control circuits" can include any one of or any combination of memory controller 120, all or a portion of system control logic 260, all or a portion of row control circuitry 220, all or a portion of column control circuitry 210, read/write circuits 225, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

For purposes of this document, the term "apparatus" can include, but is not limited to, one or more of, storage system 100, memory controller 120, storage 130, memory die 200, integrated memory assembly 207, and/or control die 211.

Figure 3A:
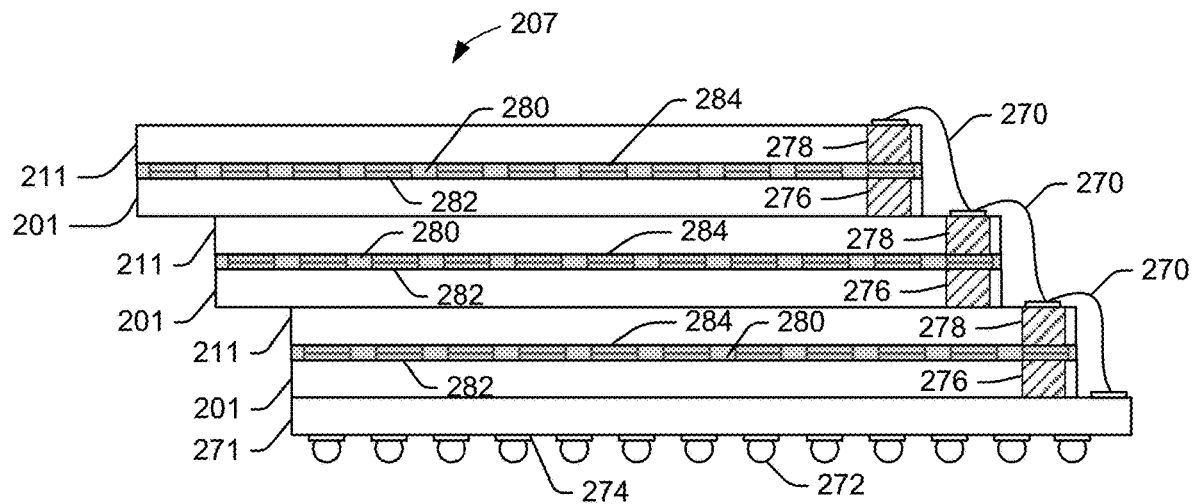
FIGS. 3A and 3B depict different embodiments of integrated memory assemblies.

In some embodiments, there is more than one control die 211 and more than one memory structure die 201 in an integrated memory assembly 207. In some embodiments, the integrated memory assembly 207 includes a stack of multiple control dies 211 and multiple memory structure dies 201. FIG. 3A depicts a side view of an embodiment of an integrated memory assembly 207 stacked on a substrate 271 (e.g., a stack comprising control die 211 and memory structure die). The integrated memory assembly 207 has three control dies 211 and three memory structure dies 201. In some embodiments, there are more than three memory structure dies 201 and more than three control dies 211. In FIG. 3A there are an equal number of memory structure dies 201 and control dies 211; however, in one embodiment, there are more memory structure dies 201 than control dies 211. For example, one control die 211 could control multiple memory structure dies 201.

Each control die 211 is affixed (e.g., bonded) to at least one of the memory structure die 201. Some of the bond pads 282/284 are depicted. There may be many more bond pads. A space between two die 201, 211 that are bonded together is filled with a solid layer 280, which may be formed from epoxy or other resin or polymer. This solid layer 280 protects the electrical connections between the die 201, 211, and further secures the die together. Various materials may be used as solid layer 280.

The integrated memory assembly 207 may for example be stacked with a stepped offset, leaving the bond pads at each level uncovered and accessible from above. Wire bonds 270 connected to the bond pads connect the control die 211 to the substrate 271. A number of such wire bonds may be formed across the width of each control die 211 (i.e., into the page of FIG. 3A).

A memory die through silicon via (TSV) 276 may be used to route signals through a memory structure die 201. A control die through silicon via (TSV) 278 may be used to route signals through a control die 211. The TSVs 276, 278 may be formed before, during or after formation of the integrated circuits in the semiconductor dies 201, 211. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package. The solder balls 272 may form a part of the interface between integrated memory assembly 207 and memory controller 120.

Figure 3B:
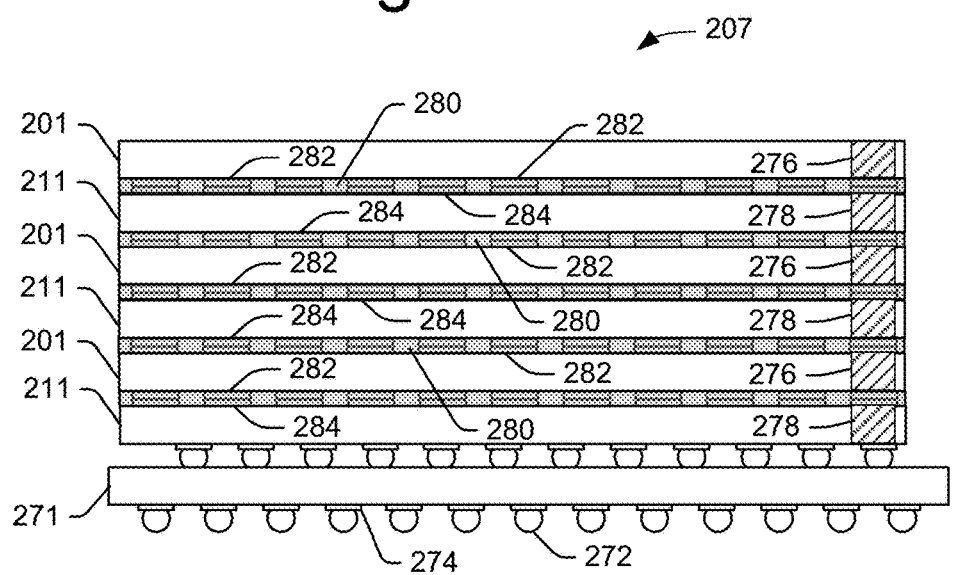

FIG. 3B depicts a side view of another embodiment of an integrated memory assembly 207 stacked on a substrate 271. The integrated memory assembly 207 of FIG. 3B has three control dies 211 and three memory structure dies 201. In some embodiments, there are many more than three memory structure dies 201 and many more than three control dies 211. In this example, each control die 211 is bonded to at least one memory structure die 201. Optionally, a control die 211 may be bonded to two or more memory structure dies 201.

Some of the bond pads 282, 284 are depicted. There may be many more bond pads. A space between two dies 201, 211 that are bonded together is filled with a solid layer 280, which may be formed from epoxy or other resin or polymer. In contrast to the example in FIG. 3A, the integrated memory assembly 207 in FIG. 3B does not have a stepped offset. A memory die through silicon via (TSV) 276 may be used to route signals through a memory structure die 201. A control die through silicon via (TSV) 278 may be used to route signals through a control die 211.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package.

As has been briefly discussed above, the control die 211 and the memory structure die 201 may be bonded together. Bond pads on each die 201, 211 may be used to bond the two die together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 µm square and spaced from each other with a pitch of 5 µm to 5 µm. While this process is referred to herein as Cu-to-Cu bonding, this term may also apply even where the bond pads are formed of materials other than Cu.

When the area of bond pads is small, it may be difficult to bond the semiconductor die together. The size of, and pitch between, bond pads may be further reduced by providing a film layer on the surfaces of the semiconductor die including the bond pads. The film layer is provided around the bond pads. When the die are brought together, the bond pads may bond to each other, and the film layers on the respective die may bond to each other. Such a bonding technique may be referred to as hybrid bonding. In embodiments using hybrid bonding, the bond pads may be about 5 µm square and spaced from each other with a pitch of 1 µm to 5 µm. Bonding techniques may be used providing bond pads with even smaller sizes and pitches.

Some embodiments may include a film on surface of the dies 201, 211. Where no such film is initially provided, a space between the die may be under filled with an epoxy or other resin or polymer. The under-fill material may be applied as a liquid which then hardens into a solid layer. This under-fill step protects the electrical connections between the dies 201, 211, and further secures the die together. Various materials may be used as under-fill material.

FIG. 3C is a block diagram depicting one embodiment of a portion of column control circuitry 210 that contains a number of read/write circuits 225. Each read/write circuit 225 is partitioned into a sense amplifier 325 and data latches 340. A managing circuit 330 controls the read/write circuits 225. The managing circuit 330 may communicate with state machine 262. In one embodiment, each sense amplifier 325 is connected to a respective bit line. Each bit line may be connected, at one point in time, to one of a large number of different NAND strings. A select gate on the NAND string may be used to connect the NAND string channel to the bit line.

Each sense amplifier 325 operates to provide voltages to one of the bit lines (see BL0, BL1, BL2, BL3) during program, verify, erase, and read operations. Sense amplifiers are also used to sense the condition (e.g., data state) of a memory cell in a NAND string connected to the bit line that connects to the respective sense amplifier.

Each sense amplifier 325 may have a sense node. During sensing, a sense node is charged up to an initial voltage, Vsense_init, such as 3V. The sense node is then connected to the bit line for a sensing time, and an amount of decay of the sense node is used to determine whether a memory cell is in a conductive or non-conductive state. The amount of decay of the sense node also indicates whether a current Icell in the memory cell exceeds a reference current, Iref. A larger decay corresponds to a larger current. If Icell<=Iref, the memory cell is in a non-conductive state and if Icell>Iref, the memory cell is in a conductive state. In an embodiment, the sense node has a capacitor that is pre-charged and then discharged for the sensing time.

In particular, the comparison circuit 320 determines the amount of decay by comparing the sense node voltage to a trip voltage after the sensing time. If the sense node voltage decays below the trip voltage, Vtrip, the memory cell is in a conductive state and its Vth is at or below the verify voltage. If the sense node voltage does not decay below Vtrip, the memory cell is in a non-conductive state and its Vth is above the verify voltage. A sense node latch 322 is set to 0 or 1, for example, by the comparison circuit 320 based on whether the memory cell is in a conductive or non-conductive state, respectively. The bit in the sense node latch 322 can also be used in a lockout scan to decide whether to set a bit line voltage to an inhibit or a program enable level in a next program loop. The bit in the sense node latch 322 can also be used in a lockout mode to decide whether to set a bit line voltage to a sense voltage or a lockout voltage in a read operation.

The data latches 340 are coupled to the sense amplifier 325 by a local data bus 346. The data latches 340 include three latches (ADL, BDL, CDL) for each sense amplifier 325 in this example. More or fewer than three latches may be included in the data latches 340. In one embodiment, for programming each data latch 340 is used to store one bit to be stored into a memory cell and for reading each data latch 340 is used to store one bit read from a memory cell. In a three bit per memory cell embodiment, ADL stores a bit for a lower page of data, BDL stores a bit for a middle page of data, CDL stores a bit for an upper page of data. Each read/write circuit 225 is connected to an XDL latch 348 by way of an XDL bus 352. In this example, transistor 336 connects local data bus 346 to XDL bus 352. An I/O interface 332 is connected to the XDL latches 348. The XDL latch 348 associated with a particular read/write circuit 225 serves as an interface latch for storing/latching data from the memory controller.

Managing circuit 330 performs computations, such as to determine the data stored in the sensed memory cell and store the determined data in the set of data latches. Each set of data latches 340 is used to store data bits determined by managing circuit 330 during a read operation, and to store data bits imported from the data bus 334 during a program operation which represent write data meant to be programmed into the memory. I/O interface 332 provides an interface between XDL latches 348 and the data bus 334.

During reading, the operation of the system is under the control of state machine 262 that controls the supply of different control gate voltages to the addressed memory cell. As it steps through the various predefined control gate voltages corresponding to the various memory states supported by the memory, the sense circuit may trip at one of these voltages and a corresponding output will be provided from the sense amplifier to managing circuit 330. At that point, managing circuit 330 determines the resultant memory state by consideration of the tripping event(s) of the sense circuit and the information about the applied control gate voltage from the state machine. It then computes a binary encoding for the memory state and stores the resultant data bits into data latches 340.

During program or verify operations for memory cells, the data to be programmed (write data) is stored in the set of data latches 340 from the data bus 334 by way of XDL latches 348. The program operation, under the control of the state machine 262, applies a series of programming voltage pulses to the control gates of the addressed memory cells. Each voltage pulse may be stepped up in magnitude from a previous program pulse by a step size in a process referred to as incremental step pulse programming. In one embodiment, each program voltage is followed by a verify operation to determine if the memory cells have been programmed to the desired memory state. In some cases, managing circuit 330 monitors the read back memory state relative to the desired memory state. When the two agree, managing circuit 330 sets the bit line in a program inhibit mode such as by updating its latches. This inhibits the memory cell coupled to the bit line from further programming even if additional program pulses are applied to its control gate.

Figure 4:
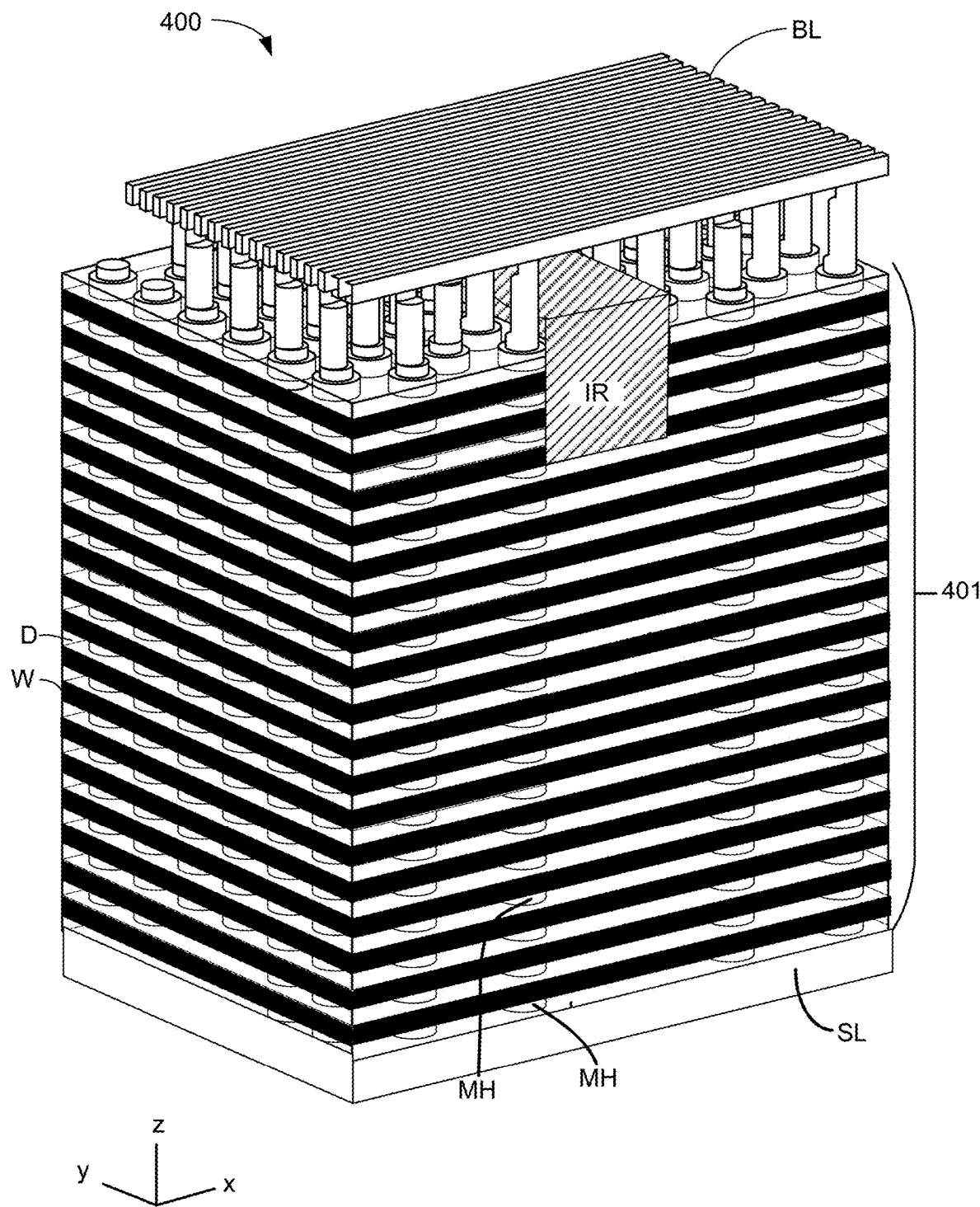
FIG. 4 is a perspective view of a portion of one example embodiment of a monolithic three dimensional memory structure.

FIG. 4 is a perspective view of a portion of one example embodiment of a monolithic three dimensional memory array/structure that can comprise memory structure 202, which includes a plurality non-volatile memory cells arranged as vertical NAND strings. For example, FIG. 4 shows a portion 400 of one block of memory. The structure depicted includes a set of bit lines BL positioned above a stack 401 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. In one embodiment the alternating dielectric layers and conductive layers are divided into four (or a different number of) regions (e.g., sub-blocks) by isolation regions IR. FIG. 4 shows one isolation region IR separating two sub-blocks. Below the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 202 is provided below.

Figure 4A:
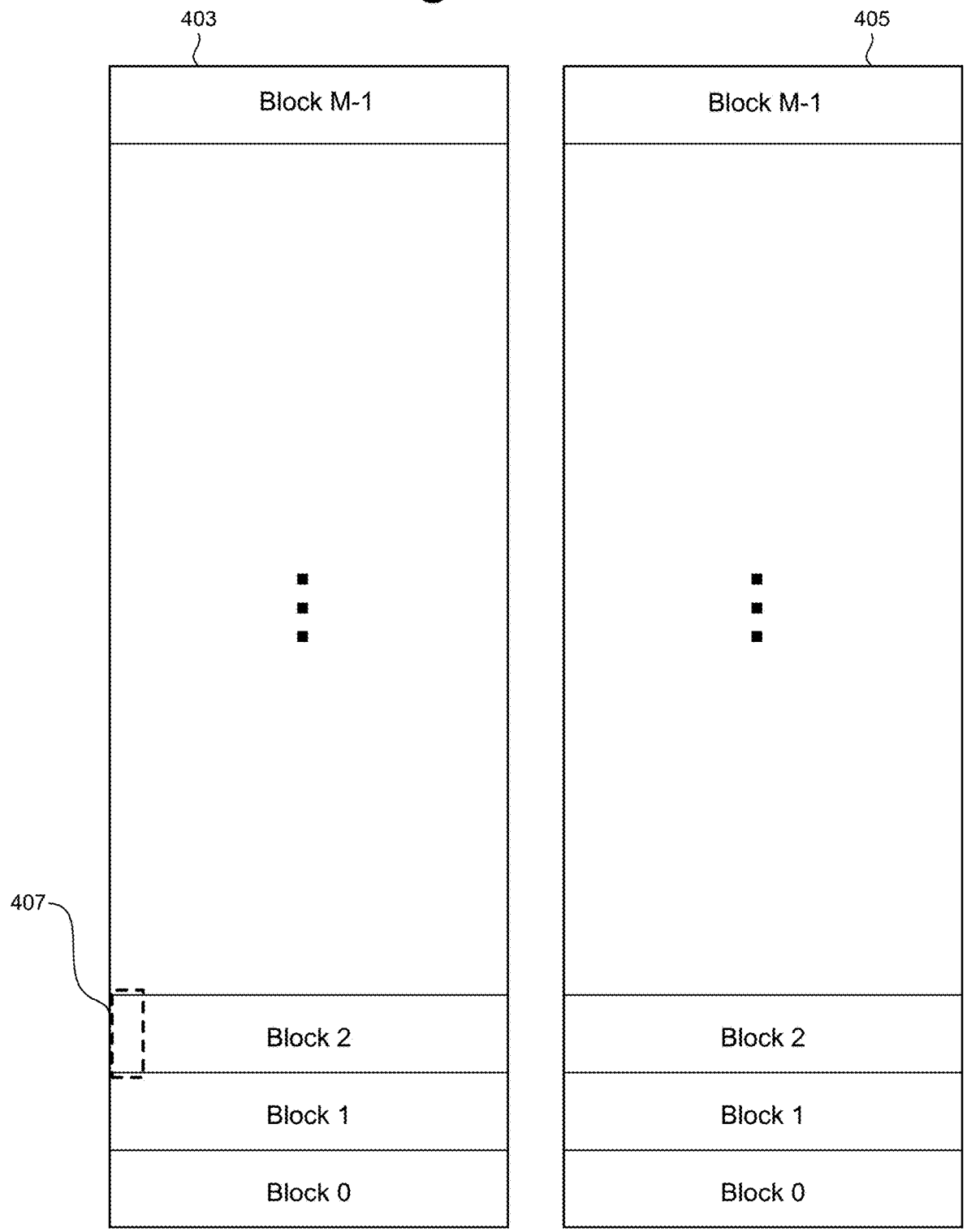
FIG. 4A is a block diagram of one embodiment of a memory structure having two planes.

FIG. 4A is a block diagram explaining one example organization of memory structure 202, which is divided into two planes 403 and 405. Each plane is then divided into M physical blocks. In one example, each plane has about 2000 physical blocks (or more briefly "blocks"). However, different numbers of blocks and planes can also be used. In one embodiment, a block of memory cells is a unit of erase. That is, all memory cells of a block are erased together. In other embodiments, blocks can be divided into sub-blocks and the sub-blocks can be the unit of erase. Memory cells can also be grouped into blocks for other reasons, such as to organize the memory structure to enable the signaling and selection circuits. In some embodiments, a block represents a groups of connected memory cells as the memory cells of a block share a common set of word lines. For example, the word lines for a block are all connected to all of the vertical NAND strings for that block. Although FIG. 4A shows two planes 403/405, more or fewer than two planes can be implemented. In some embodiments, memory structure 202 includes four planes. In some embodiments, memory structure 202 includes eight planes. In some embodiments, programming can be performed in parallel in a first selected block in plane 403 and a second selected block in plane 405.

Figure 4B:
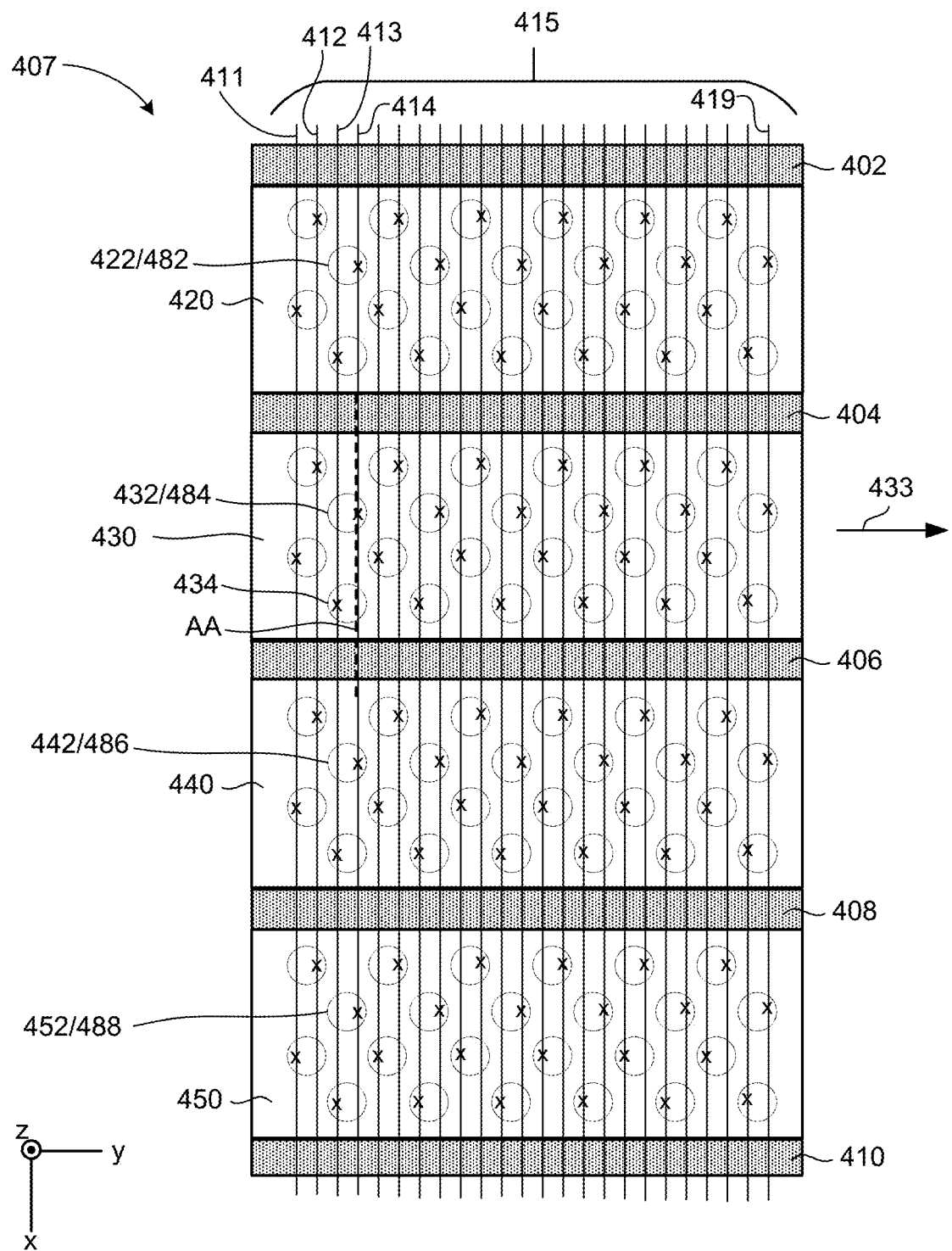
FIG. 4B is a block diagram depicting a top view of a portion of block of memory cells.

FIGS. 4B-4E depict an example three dimensional ("3D") NAND structure that corresponds to the structure of FIG. 4 and can be used to implement memory structure 202 of FIGS. 2A and 2B. FIG. 4B is a diagram depicting a top view of a portion 407 of Block 2. As can be seen from FIG. 4B, the physical block depicted in FIG. 4B extends in the direction of arrow 433. In one embodiment, the memory array has many layers; however, FIG. 4B only shows the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442, and 452. Vertical column 422 implements NAND string 482. Vertical column 432 implements NAND string 484. Vertical column 442 implements NAND string 486. Vertical column 452 implements NAND string 488. More details of the vertical columns are provided below. Since the physical block depicted in FIG. 4B extends in the direction of arrow 433, the physical block includes more vertical columns than depicted in FIG. 4B.

FIG. 4B also depicts a set of bit lines 415, including bit lines 411, 412, 413, 414, . . . 419. FIG. 4B shows twenty-four bit lines because only a portion of the physical block is depicted. It is contemplated that more than twenty-four bit lines connected to vertical columns of the physical block. Each of the circles representing vertical columns has an "x" to indicate its connection to one bit line. For example, bit line 414 is connected to vertical columns 422, 432, 442 and 452.

The physical block depicted in FIG. 4B includes a set of isolation regions 402, 404, 406, 408, and 410, which are formed of $SiO_2$; however, other dielectric materials can also be used. Isolation regions 402, 404, 406, 408, and 410 serve to divide the top layers of the physical block into four regions; for example, the top layer depicted in FIG. 4B is divided into regions 420, 430, 440, and 450, which are referred to as sub-blocks. Each sub-block contains a large number of NAND strings. In one embodiment, isolation regions 402 and 410 separate the physical block 407 from adjacent physical blocks. Thus, isolation regions 402 and 410 may extend down to the substrate. In one embodiment, the isolation regions 404, 406, and 408 only divide the layers used to implement select gates so that NAND strings in different sub-blocks can be independently selected. Referring back to FIG. 4, the IR region may correspond to any of isolation regions 404, 406, or 408. In one example implementation, a bit line only connects to one vertical column/NAND string in each of regions (sub-blocks) 420, 430, 440, and 450. In that implementation, each physical block has sixteen rows of active columns and each bit line connects to four NAND strings in each block. In one embodiment, all of the four vertical columns/NAND strings connected to a common bit line are connected to the same word line (or set of word lines); therefore, the system uses the drain side selection lines to choose one (or another subset) of the four to be subjected to a memory operation (program, verify, read, and/or erase).

Although FIG. 4B shows each region (420, 430, 440, 450) having four rows of vertical columns, four regions (420, 430, 440, 450) and sixteen rows of vertical columns in a block, those exact numbers are an example implementation. Other embodiments may include more or fewer regions (420, 430, 440, 450) per block, more or fewer rows of vertical columns per region and more or fewer rows of vertical columns per block. FIG. 4B also shows the vertical columns being staggered. In other embodiments, different patterns of staggering can be used. In some embodiments, the vertical columns are not staggered.

Figure 4C:
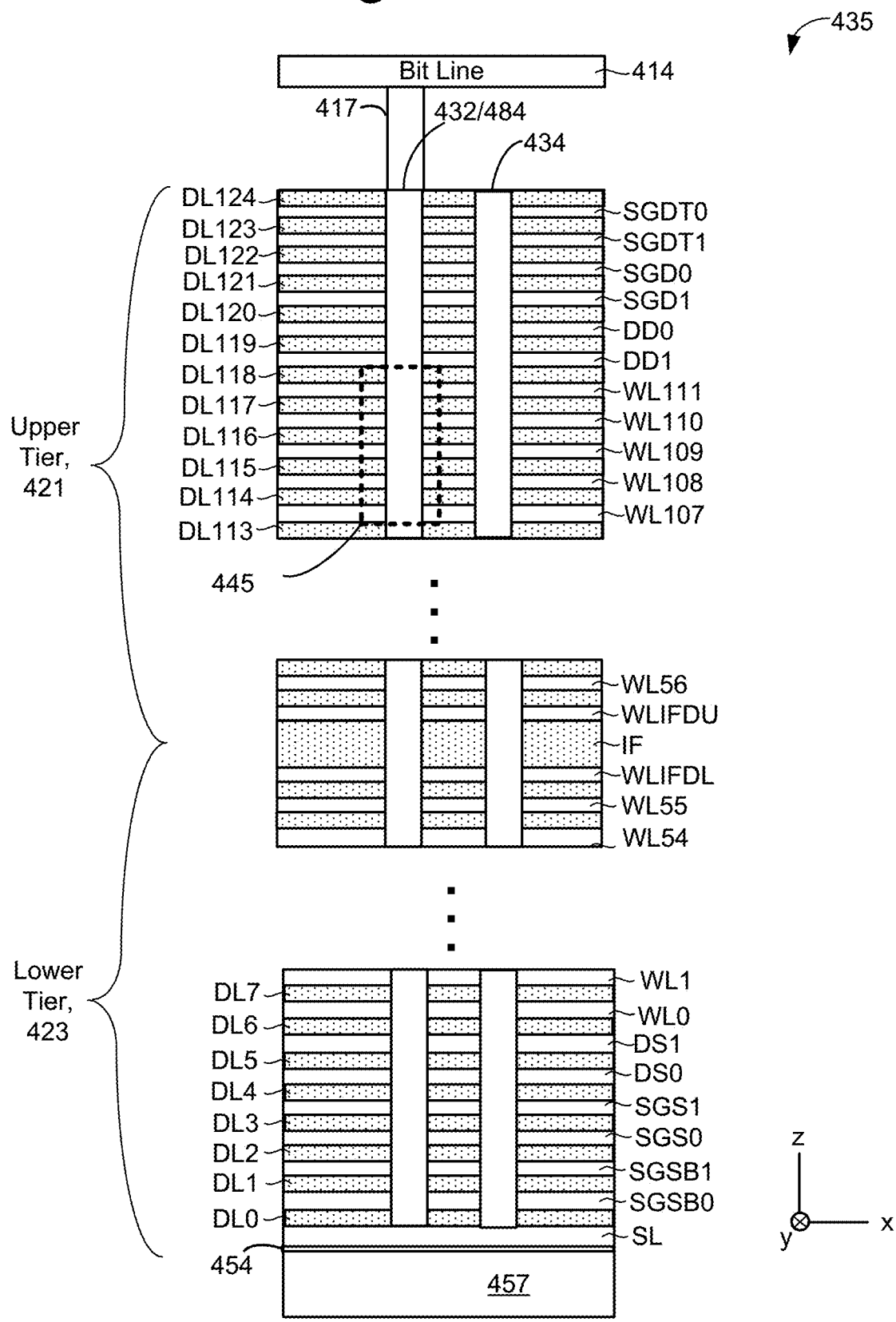
FIG. 4C depicts an embodiment of a stack showing a cross-sectional view along line AA of FIG. 4B.

FIG. 4C depicts an example of a stack 435 showing a cross-sectional view along line AA of FIG. 4B. The SGD layers include SGDT0, SGDT1, SGD0, and SGD1. The SGD layers may have more or fewer than four layers. The SGS layers includes SGSB0, SGSB1, SGS0, and SGS1. The SGS layers may have more or fewer than four layers. Six dummy word line layers DD0, DD1, WLIFDU, WLIDDL, DS1, and DS0 are provided, in addition to the data word line layers WL0-WL111. There may be more or fewer than 112 data word line layers and more or fewer than four dummy word line layers. Each NAND string has a drain side select gate at the SGD layers. Each NAND string has a source side select gate at the SGS layers. Also depicted are dielectric layers DL0-DL124.

Columns 432, 434 of memory cells are depicted in the multi-layer stack. The stack includes a substrate 457, an insulating film 454 on the substrate, and a portion of a source line SL. A portion of the bit line 414 is also depicted. Note that NAND string 484 is connected to the bit line 414. NAND string 484 has a source-end at a bottom of the stack and a drain-end at a top of the stack. The source-end is connected to the source line SL. A conductive via 417 connects the drain-end of NAND string 484 to the bit line 414.

In one embodiment, the memory cells are arranged in NAND strings. The word line layers WL0-WL111 connect to memory cells (also called data memory cells). Dummy word line layers DD0, DD1, DS0 and DS1 connect to dummy memory cells. A dummy memory cell does not store and is not eligible to store host data (data provided from the host, such as data from a user of the host), while a data memory cell is eligible to store host data. In some embodiments, data memory cells and dummy memory cells may have the same structure. Drain side select layers SGD are used to electrically connect and disconnect (or cut off) the channels of respective NAND strings from bit lines. Source side select layers SGS are used to electrically connect and disconnect (or cut off) the channels of respective NAND strings from the source line SL.

FIG. 4C depicts an example of a stack 435 having two tiers. The two-tier stack comprises an upper tier 421 and a lower tier 423. A two-tier or other multi-tier stack can be used to form a relatively tall stack while maintaining a relatively narrow memory hole width (or diameter). After the layers of the lower tier are formed, memory hole portions are formed in the lower tier. Subsequently, after the layers of the upper tier are formed, memory hole portions are formed in the upper tier, aligned with the memory hole portions in the lower tier to form continuous memory holes from the bottom to the top of the stack. The resulting memory hole is narrower than would be the case if the hole were etched from the top to the bottom of the stack rather than in each tier individually. An interface (IF) region is created where the two tiers are connected. The IF region is typically thicker than the other dielectric layers. Due to the presence of the IF region, the adjacent word line layers suffer from edge effects such as difficulty in programming or erasing. These adjacent word line layers can therefore be set as dummy word lines (WLIFDL, WLIFDU). In some embodiments, the upper tier 421 and the lower tier 423 are erased independent of one another. Hence, data may be maintained in the lower tier 423 after the upper tier 421 is erased. Likewise, data may be maintained in the upper tier 421 after the lower tier 423 is erased.

Figure 4D:
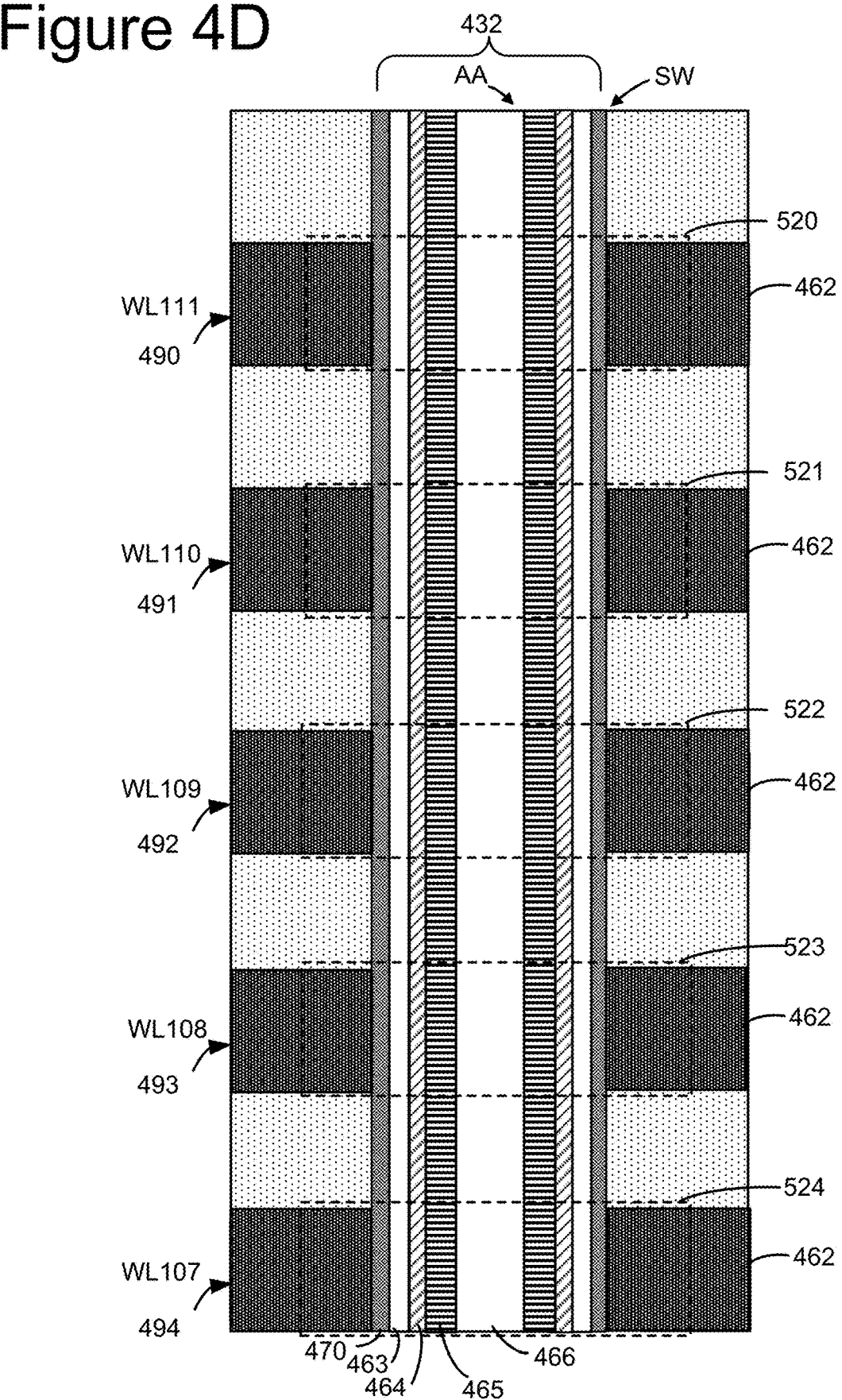
FIG. 4D depicts a view of the region 445 of FIG. 4C.

FIG. 4D depicts a view of the region 445 of FIG. 4C. Data memory cell transistors 520, 521, 522, 523, and 524 are indicated by the dashed lines. A number of layers can be deposited along the sidewall (SW) of the memory hole 432 and/or within each word line layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A word line layer can include a conductive metal 462 such as Tungsten as a control gate. For example, control gates 490, 491, 492, 493 and 494 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel.

Each of the memory holes can be filled with a plurality of annular layers (also referred to as memory film layers) comprising a blocking oxide layer, a charge trapping layer, a tunneling layer and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

Figure 4E:
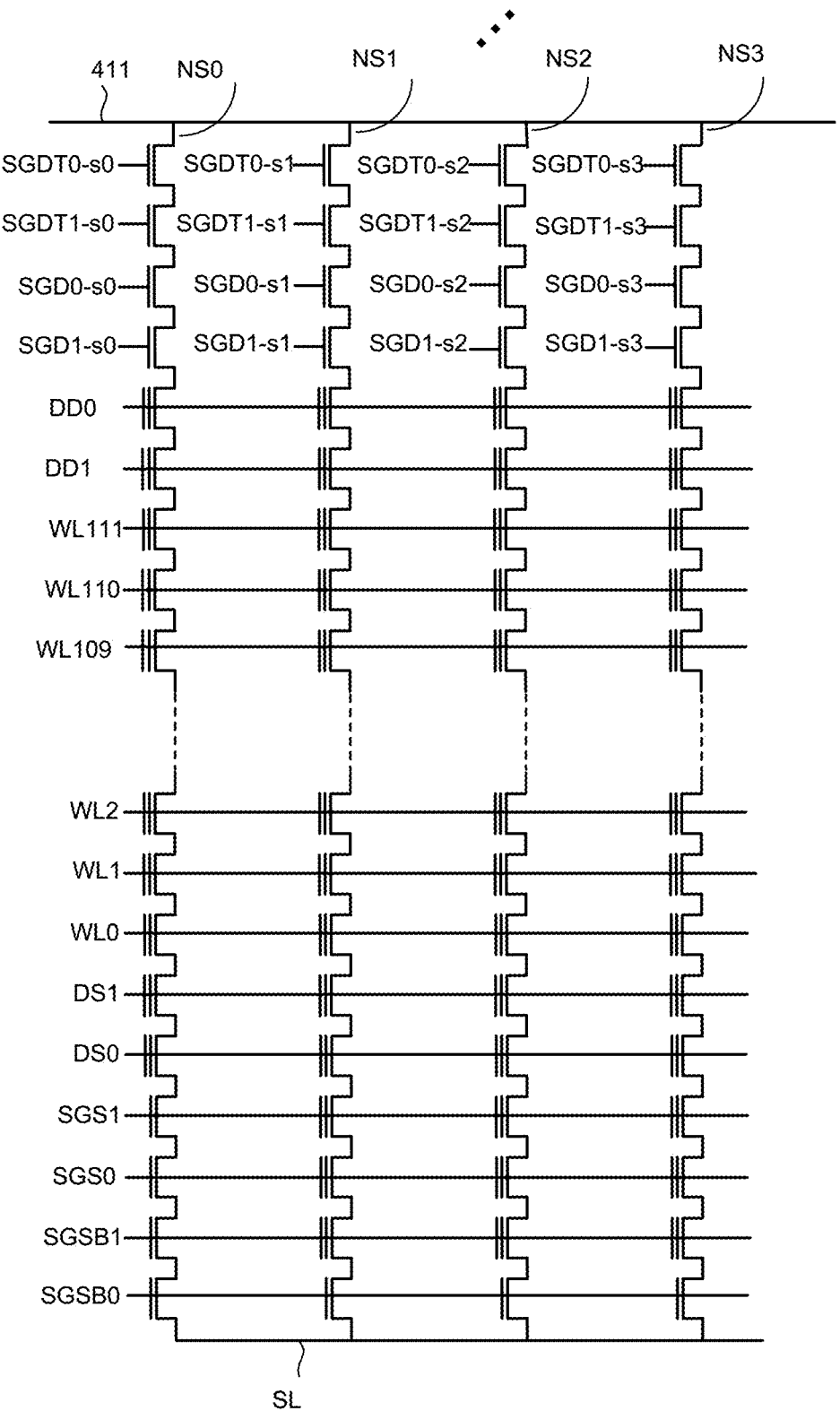
FIG. 4E is a schematic diagram of a portion of one embodiment of a block, depicting several NAND strings.

FIG. 4E is a schematic diagram of a portion of the memory array 202. FIG. 4E shows physical data word lines WL0-WL111 running across the entire block. The structure of FIG. 4E corresponds to a portion 407 in Block 2 of FIG. 4A, including bit line 411. Within the physical block, in one embodiment, each bit line is connected to four NAND strings. Thus, FIG. 4E shows bit line 411 connected to NAND string NS0, NAND string NS1, NAND string NS2, and NAND string NS3.

In one embodiment, there are four sets of drain side select lines in the physical block. For example, the set of drain side select lines connected to NS0 include SGDT0-s0, SGDT1-s0, SGD0-s0, and SGD1-s0. The set of drain side select lines connected to NS1 include SGDT0-s1, SGDT1-s1. SGD0-s1, and SGD1-s1. The set of drain side select lines connected to NS2 include SGDT0-s2, SGDT1-s2, SGD0-s2, and SGD1-s2. The set of drain side select lines connected to NS3 include SGDT0-s3, SGDT1-s3, SGD0-s3, and SGD1-s3. Herein the term "SGD" may be used as a general term to refer to any one or more of the lines in a set of drain side select lines. In some embodiments, the same operating voltage is applied to SGDT0 and SGDT1. In some embodiments, the same operating voltage is applied to SGD0 and SGD1. In some erase embodiments, different operating voltage are applied to SGDT0/SGDT1 than to SGD0/SGD1. Note that SGDT0/SGDT1 are adjacent to the bit line. In some erase embodiments, a voltage applied to SGDT0/SGDT1 in combination with a bit line voltage may be used to generate a gate induced gate leakage (GIDL) current. Such a voltage applied to SGDT0/SGDT1 may be referred to herein as a GIDL voltage.

In an embodiment, each line in a given set may be operated independent from the other lines in that set to allow for different voltages to the gates of the four drain side select transistors on the NAND string. Moreover, each set of drain side select lines can be selected independent of the other sets. Each set drain side select lines connects to a group of NAND strings in the block. Only one NAND string of each group is depicted in FIG. 4E. These four sets of drain side select lines correspond to four sub-blocks. A first sub-block corresponds to those vertical NAND strings controlled by SGDT0-s0, SGDT1-s0, SGD0-s0, and SGD1-s0. A second sub-block corresponds to those vertical NAND strings controlled by SGDT0-s1. SGDT1-s1, SGD0-s1, and SGD1-s1. A third sub-block corresponds to those vertical NAND strings controlled by SGDT0-s2, SGDT1-s2, SGD0-s2, and SGD1-s2. A fourth sub-block corresponds to those vertical NAND strings controlled by SGDT0-s3, SGDT1-s3, SGD0-s3, and SGD1-s3. As noted, FIG. 4E only shows the NAND strings connected to bit line 411. However, a full schematic of the block would show every bit line and four vertical NAND strings connected to each bit line.

In one embodiment, all of the memory cells on the NAND strings in a physical block are erased as a unit. However in some embodiments, a physical block is operated as an upper tier and a lower tier, wherein the upper tier and the lower tier each form an erase unit. For example, memory cells connected to WL0-WL55 may be in the lower tier 423 and memory cells connected to WL56-WL111 may be in the upper tier 421. Hence, memory cells connected to WL0-WL55 may be in one erase unit and memory cells connected to WL56-WL111 may be in another erase unit. A physical block could be operated in more than two tiers. Erase units can be formed based on other divisions of physical blocks.

Although the example memories of FIGS. 4-4E are three dimensional memory structure that includes vertical NAND strings with charge-trapping material, other 3D memory structures can also be used with the technology described herein.

Figure 5A:
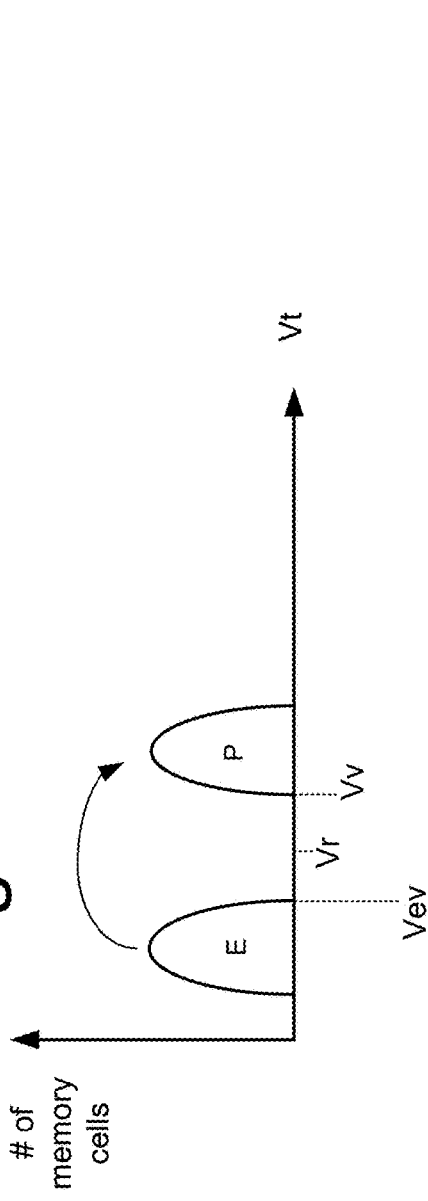
FIGS. 5A and 5B depicts threshold voltage distributions.

The storage systems discussed above can be erased, programmed and read. At the end of a successful programming process, the threshold voltages of the memory cells should be within one or more distributions of threshold voltages for programmed memory cells or within a distribution of threshold voltages for erased memory cells, as appropriate. FIG. 5A is a graph of threshold voltage versus number of memory cells, and illustrates example threshold voltage distributions for the memory array when each memory cell stores one bit of data per memory cell. Memory cells that store one bit of data per memory cell data are referred to as single level cells ("SLC"). The data stored in SLC memory cells is referred to as SLC data; therefore, SLC data comprises one bit per memory cell. Data stored as one bit per memory cell is SLC data. FIG. 5A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." FIG. 5A depicts read reference voltage Vr. By testing (e.g., performing one or more sense operations) whether the threshold voltage of a given memory cell is above or below Vr, the system can determine a memory cells is erased (state E) or programmed (state P). FIG. 5A also depicts program verify reference voltage Vv. In some embodiments, when programming memory cells to data state P, the system will test whether those memory cells have a threshold voltage greater than or equal to Vv.

Memory cells that store multiple bit per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. In the example embodiment of FIG. 5B, each memory cell stores three bits of data. Other embodiments may use other data capacities per memory cell (e.g., such as two, four, or five bits of data per memory cell).

Figure 5B:
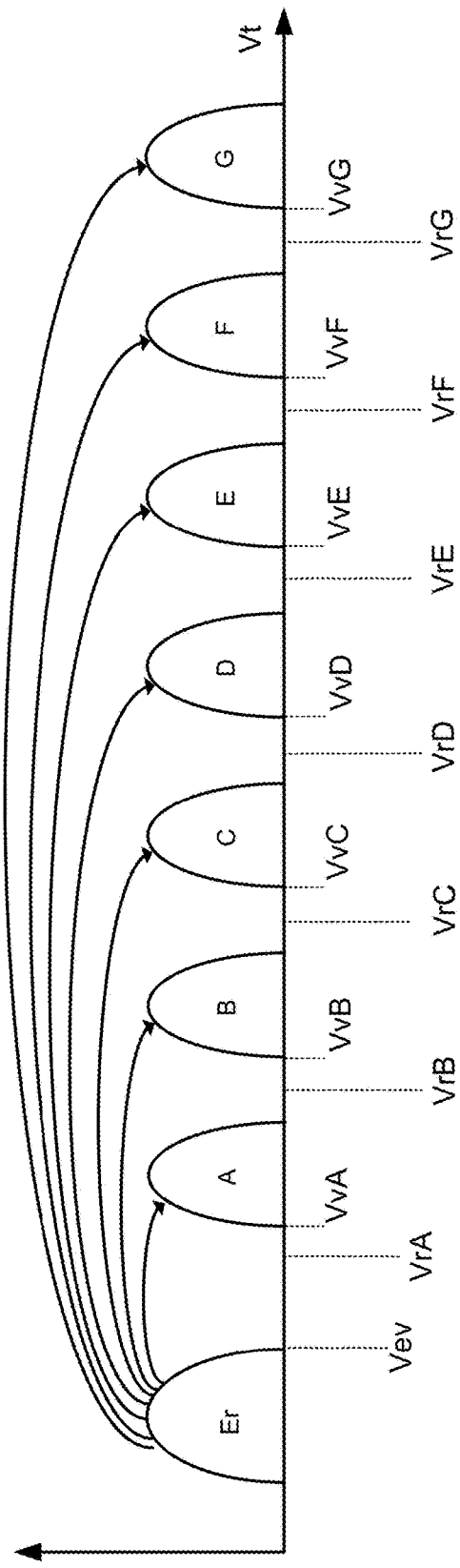

FIG. 5B shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected. In an embodiment, the number of memory cells in each state is about the same.

FIG. 5B shows seven read reference voltages, VrA, VrB, VlC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in. FIG. 5B also shows a number of verify reference voltages. The verify reference voltages are VvA, VvB, VvC, VVD, VvE, VvF, and VvG. In some embodiments, when programming memory cells to data state A, the system will test whether those memory cells have a threshold voltage greater than or equal to VvA. If the memory cell has a threshold voltage greater than or equal to VvA, then the memory cell is locked out from further programming. Similar reasoning applies to the other data states.

The erase verify levels (Vev) depicted in FIGS. 5A and 5B are final target erase verify levels. In some embodiments, the memory system will verify erase at the final target erase verify level and a somewhat higher erase verify level. The somewhat higher erase verify level may be used to determine whether the NAND string is relatively close to being erased, but not yet erased. The use of two erase verify levels may be used to place NAND strings into different groups (e.g., normal erase, slow erase, inhibit erase) in order to prevent over-erase. Further details are discussed below.

FIG. 6 shows two Vt distributions following erase of memory cells. Threshold voltage distribution 602 is a tight distribution that results in embodiments of erase disclosed herein that prevent over-erase. Threshold voltage distribution 604 shows a very wide distribution with a substantial number of memory cells being over-erased. The over-erase of memory cells in voltage distribution 604 damages the memory cells, especially due to the cumulative damage of repeatedly over-erasing the memory cells. The over-erase of memory cells in voltage distribution 604 can also result in a data retention issue.

FIG. 7 graphically depicts a possible explanation of lateral data retention issue that may arise due to over-erase of memory cells. FIG. 7 depicts a simplified view of FIG. 4D with WLn and an adjacent word lines WLn−1. FIG. 7 depicts a memory hole MH including inner core layer 466, channel layer 465, tunneling dielectric layer 464, charge trapping (or storage) layer 463, and blocking layer 470. The memory cell at WLn has been over-erased and has many holes in the charge trapping layer 463. The adjacent memory cell has been programmed to a high Vt state and has many electrons. The lateral DR is due, at least in part, to movement of electrons and/or holes in the charge trapping layer 463. FIG.

7 depicts an example of possible electron movement and possible hole movement in charge trapping layer 463. Significantly, if holes move from the erased cell to the High Vt cell and/or if electrons move from the High Vt cell to the erased cell, the Vt of the High Vt cell will be reduced. Note that this charge movement may occur over relatively long periods of time. Hence, this is referred as a data retention (DR) issue. Moreover, if the erased cell has been over-erased the large number of holes will accentuate the DR issue.

In an embodiment, erasing the memory cells generates gate induced drain leakage (GIDL) current to charge up the NAND string channel. An erase enable voltage is applied to control gates of the memory cells, while maintaining the NAND string channel potential to erase the memory cells. The GIDL current is generated by causing a drain-to-gate voltage at a select transistor (e.g., drain side), in one embodiment. The drain voltage is a result of the bit line voltage. In an embodiment the gate voltage is the result of the voltage applied to SGDT0/SGDT1. The GIDL current may result when the select transistor drain voltage is significantly higher than the select transistor control gate voltage. GIDL current is a result of carrier generation, i.e., electron-hole pair generation due to band-to-band tunneling and/or trap-assisted generation. In one embodiment, GIDL current may result in one type of carriers, e.g., holes, predominantly moving into NAND channel 465 (see FIG. 4D), thereby raising the potential of the channel 465. The other type of carriers, e.g., electrons, are extracted from the channel 465, in the direction of a bit line or in the direction of a source line, by an electric field. During erase the holes may tunnel from the channel to a charge storage region 463 of memory cells and recombine with electrons there to lower the threshold voltage of the memory cells.

Figure 8:
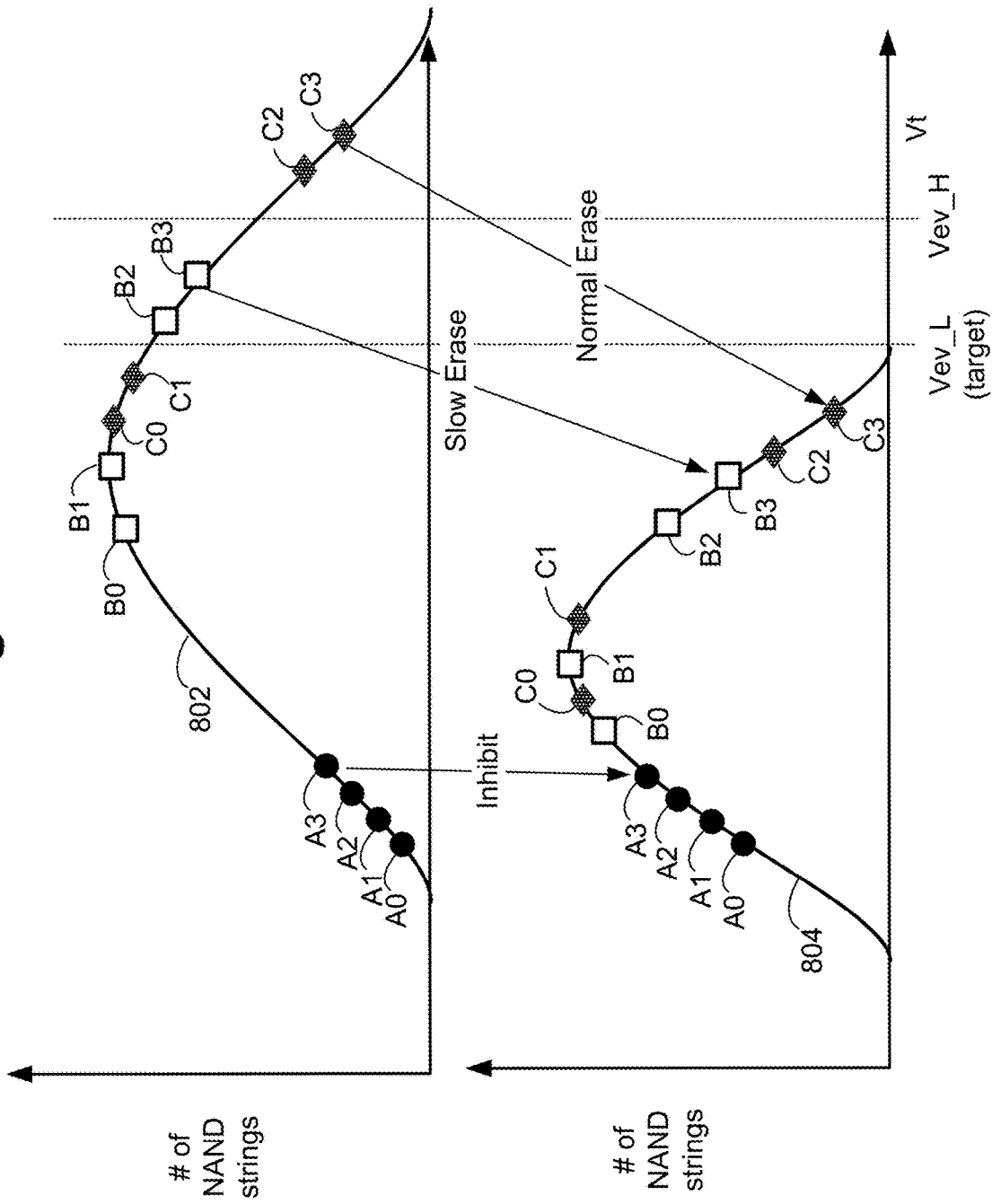
FIG. 8 depicts Vt distributions of NAND strings for an embodiment of erase that prevents over-erase.

FIG. 8 depicts Vt distributions of NAND strings for an embodiment of erase that prevents over-erase. Herein when erase verifying a NAND string the erase verify voltage may be applied to all memory cells under erase. Hence, the Vt of a NAND string is defined herein as the highest Vt of a memory cell under erase on the NAND string. FIG. 8 shows a Vt distribution 802 after one or more erase pulses are applied the memory cells and a final Vt distribution 804 after erase is complete. Each Vt distribution 802, 804 shows the Vt of a number of example NAND strings. In the example in FIG. 8, each bit line is connected to four NAND strings. Furthermore, there are three different bit lines. Thus, there are three sets of NAND strings (NAND strings A0, A1, A2, A3 connected to a first bit line; NAND strings B0, B1, B2, B3 connected to a second bit line; and NAND strings C0, C1, C2, C3 connected to a third bit line). In general, a bit line will connect to two or more NAND strings under erase.

Vt distribution 802 is an example after one or more erase pulses (or erase voltages) are applied the memory cells. Note that the phrase, "apply an erase pulse", "apply an erase voltage" or the like to a memory cell refers to applying a voltage across the memory cell between the cell channel and the cell gate. An erase pulse may be applied to a memory cell by applying a voltage to a bit line (which passes to the cell channel) in combination with applying a suitable voltage to the memory cell gate (by a word line). After applying the erase voltage to the memory cells, the NAND strings are verified. Two erase verify reference voltages are depicted (Vev_L, Vev_H). The final target level is Vev_L. The high erase verify voltage Vev_H is used in an embodiment to determine whether the NAND strings are close to the final target level. In the example Vt distribution 802 some NAND strings have a Vt above Vev_H, some NAND strings have a Vt between Vev_L and Vev_H and some NAND strings have a Vt below Vev_L.

After erase verifying the NAND strings, the bit lines are placed into one of three groups based the erase status of the NAND strings connected to the respective bit line. In one embodiment the three groups are: normal erase, slow erase, and inhibit erase. The group in which a bit line has been placed will control how erase is performed on the NAND strings connected to that bit line in the next erase loop. A bit line in the normal erase group will receive an erase voltage that erases the NAND strings connected to that bit at a normal speed. A bit line in the slow erase group will receive a lower magnitude erase voltage that erases the NAND strings connected to that bit at a slower speed. A bit line in the inhibit erase group will receive a voltage that inhibits erase in the NAND strings connected to that bit line.

In an embodiment, if at least one NAND string connected to a bit line has a Vt above Vev_H the bit line is placed in the normal erase group. Because NAND strings C2 and C3 have a Vt above Vev_H, the third bit line is placed into the normal erase group. In an embodiment, if all NAND strings connected to a bit line have a Vt below Vev_H, but at least one NAND string has a Vt above Vev_L the bit line is placed in the slow erase group. Because NAND strings B0, B1, B2, and B3 all have a Vt below Vev_H, but B2 and B3 have a Vt above Vev_L the second bit line is placed into the slow erase group. In an embodiment, if all NAND strings connected to a bit line have a Vt below Vev_L the bit line is placed in the inhibit erase group. Because NAND strings A0, A1, A2, and A3 all have a Vt below Vev_L, the first bit line is placed into the inhibit erase group.

Vt distribution 804 is an example after another erase loop. NAND strings C0, C1. C2, and C3 each have a significant drop in Vt due to their bit line receiving the normal erase voltage. In this example, the normal erase voltage results in a fast erase speed that results in NAND strings C2 and C3 moving from above Vev_H to below Vev_L. NAND strings B0, B1, B2, and B3 each have a smaller drop in Vt than C0, C1, C2, and C3 due to their bit line receiving the slow erase voltage. In this example, the slow erase voltage results in a slow erase speed that results in NAND strings B2 and B3 moving from above Vev_L to below Vev_L. Moreover, NAND strings B0 and B1 do not get over-erased due to the slower erase speed. NAND strings A0, A1, A2, and A3 do not drop in Vt due their bit line receiving the inhibit erase voltage. The phrase, "speed of erase" or the like refers to how much the Vt of a NAND string drops as a result of applying the erase pulse. A larger drop in Vt corresponds to a faster erase speed.

Figure 9:
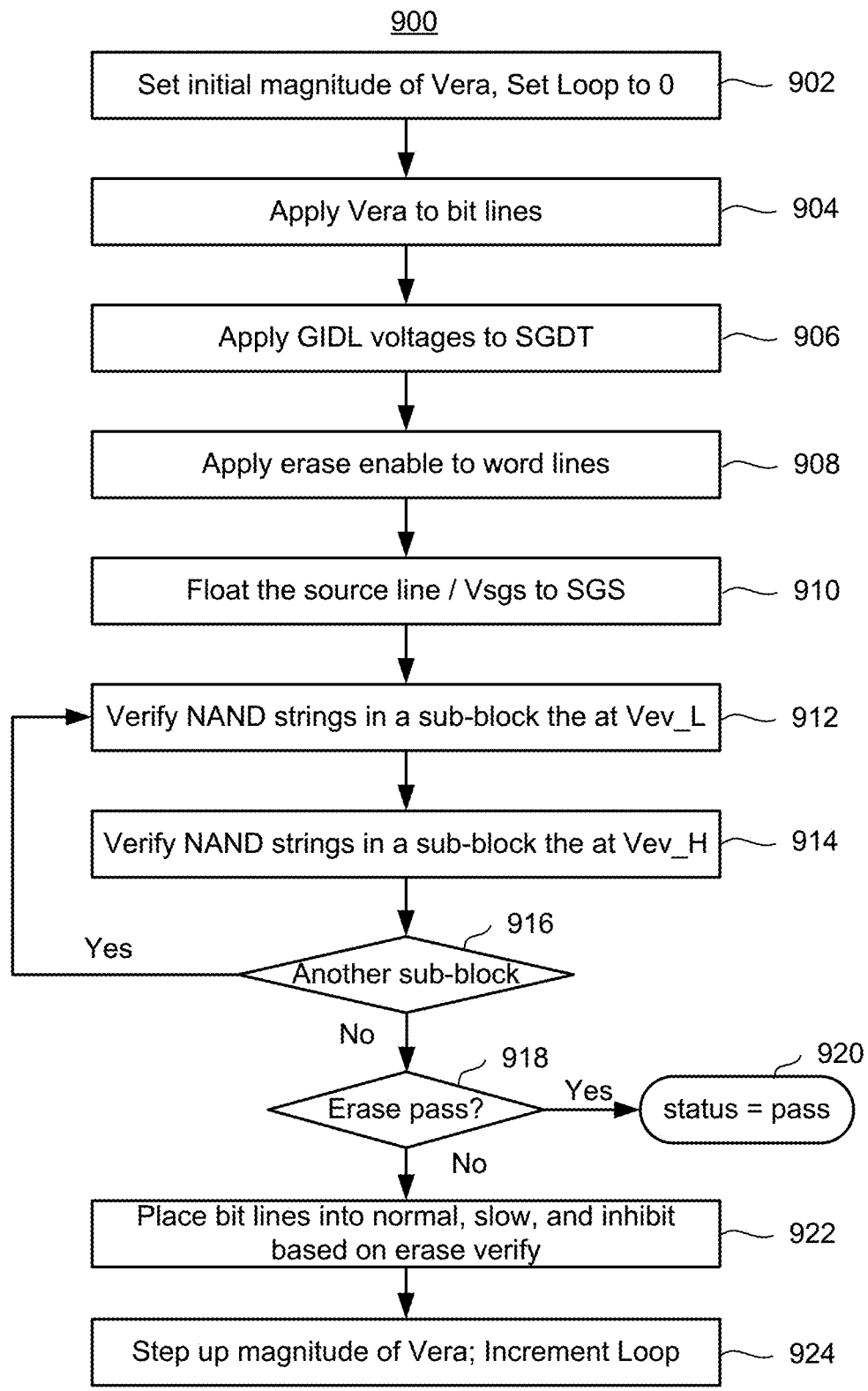
FIG. 9 is a flowchart describing one embodiment of a first loop of a multi-loop GIDL based erase procedure.

FIG. 9 is a flowchart describing one embodiment of a first loop of a multi-loop GIDL based erase procedure. In one embodiment, the erase procedure may be used to erase an entire physical block of NAND memory cells. In one embodiment, the erase procedure may be used to erase a tier of the physical block of NAND memory cells. In the example in FIG. 4C, upper tier 421 and lower tier 423 may be erased separately. In an embodiment, system control logic 260 performs the erase procedure in response to a command from the memory controller 120. An embodiment of the erase procedure is a single sided erase in which an erase voltage (Vera) is applied at the bit line (drain) ends of NAND strings.

Step 902 includes setting an initial magnitude of an erase voltage (Vera). The initial Vera may have a relatively large magnitude such as, for example, about 18V. Step 902 also includes setting a loop counter to 0. The loop counter will be used to track an allowed number of erase loops prior to ending the erase procedure in the event erase has not passed. Step 904 includes applying an erase voltage (Vera) to the bit lines. Step 906 includes applying a GIDL voltage to transistors adjacent to the bit lines (e.g., SGDT). The difference in voltage between Vera and the GIDL voltage will generate a GIDL current at the drain end of the NAND strings. Step 908 includes applying an erase enable voltage to the word lines in the erase group. In one embodiment, the erase enable voltage is about 0.5V but could be higher or lower. Step 910 includes floating the source line. Step 910 also includes applying a select voltage to source side select lines (e.g., SGS).

Figure 10:
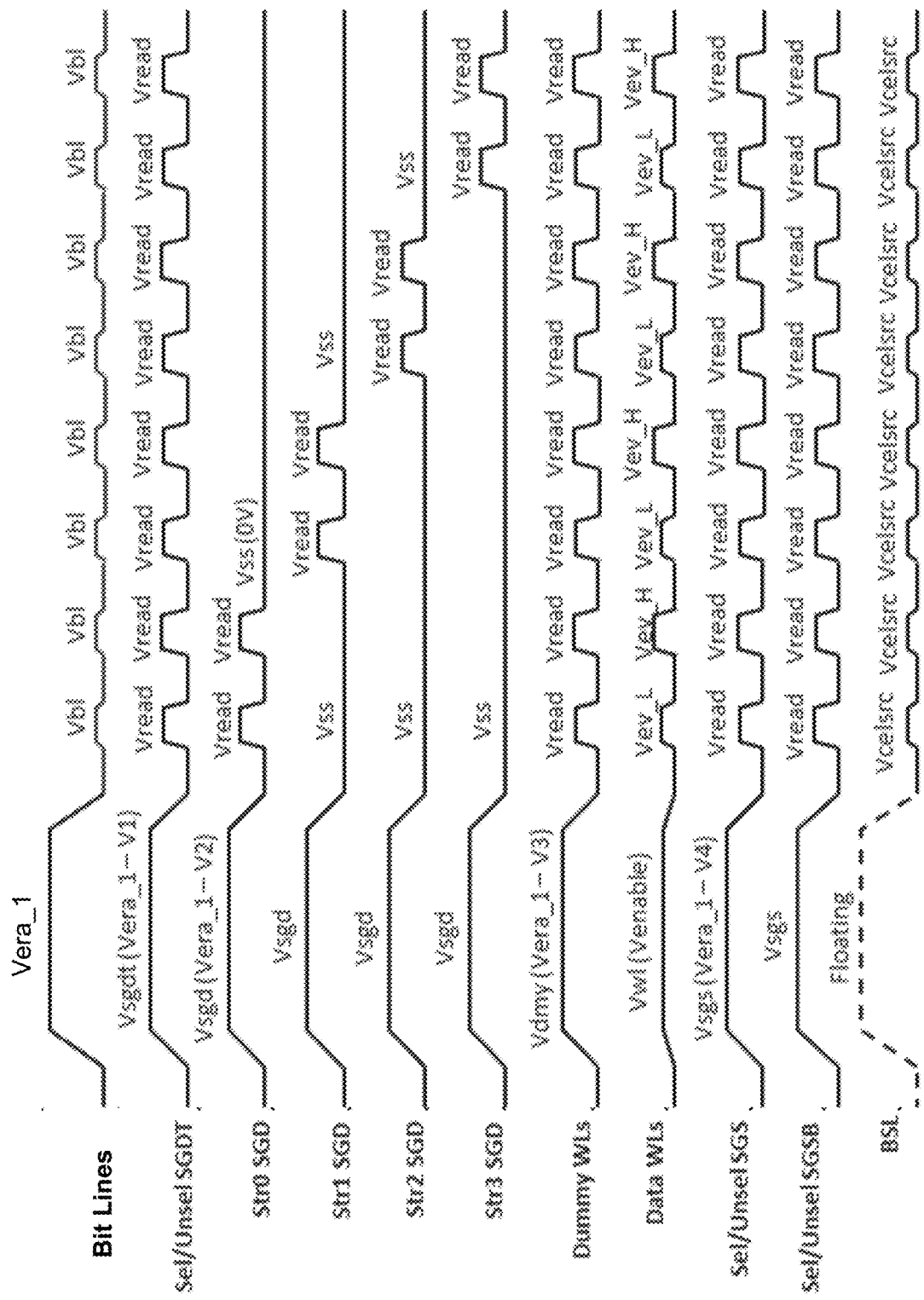
FIG. 10 depicts a timing diagram of voltages applied to various control lines during an embodiment of the first erase loop.

FIG. 10 depicts a timing diagram of voltages applied to various control lines during an embodiment of the first erase loop. The control lines correspond to example architecture depicted in FIGS. 4B, 4C, and 4D. In the first erase loop, all bit lines may have Vera_1 applied thereto. Some example voltages will be described in connection with FIG. 10; but the voltages could be higher or lower. An example of Vera_1 is 17.6V. The voltage Vsdgt is applied to the SGDT lines. In FIGS. 4C and 4E there are two SGDT lines (SGDT0, SGDT1). The same voltage may be applied to each SGDT line. An example of Vsdgt is Vera_1–V1, wherein V1 may be about 11.2V. Thus, Vsdgt may be about 6.4V. The voltage Vsdg is applied to the SGD lines. In FIGS. 4C and 4E there are two SGD lines (SGD0, SGD1). The same voltage may be applied to each SGD line. An example of Vsdg is Vera_1–V2, wherein V2 may be about 7.6V. Thus, Vsdg may be about 10V. Note that during the erase portion of the erase loop all of the sub-blocks may be selected for erase.

Continuing on with the timing diagram during the erase portion of the erase loop Vdmy may be applied to the dummy word lines. An example of Vdmy is Vera_1–V3, wherein V1 may be about 10.4V. Thus, Vdmy may be about 7.2V. Vw1 may be applied to the data word lines. An example of Vw1 is 0.5V. The voltage Vsgs is applied to the SGS lines. In FIGS. 4C and 4E there are two SGS lines (SGS0, SGS1). The same voltage may be applied to each SGS line. An example of Vsgs is Vera_1–V4, wherein V4 may be about 7.6V. Thus, Vsdg may be about 10V. The voltage Vsgs is also applied to the SGSB lines. In FIGS. 4C and 4E there are two SGSB lines (SGSB0, SGSB1). The same voltage may be applied to each SGSB line. The source line (BSL) is left floating.

The voltages result in a GIDL current in the transistors at the drain end (adjacent to the bit lines). The GIDL current allows the erase voltage to pass to the channels of the NAND strings. The GIDL current also provides holes for erase. Thus, the erase of a memory cell includes applying an erase enable voltage (e.g., 0.5V) to the control gate of the memory cell while applying an erase voltage to a channel or body of the memory cell.

Referring now to the erase verify portion of FIG. 9, step 912 includes verifying the NAND strings with respect to a low erase verify level (e.g., Vev_L). Step 914 includes verifying the NAND strings with respect to a high erase verify level (Vev_H). Note that steps 912 and 914 are performed on a NAND string basis. Step 916 includes determining whether there is another sub-block to verify. Referring back to the example in FIG. 4B, there are four sub-blocks in the block. Each bit line connects to one NAND string in each sub-block. In an embodiment, the memory system tracks the erase status of the NAND strings that are connected to the same bit line. Further details are described below.

FIG. 10 shows the timing of voltages applied to the control lines during erase verify. The erase verify is dividing into eight segments in this example due to the two erase verify levels and the four sub-blocks. The bit line voltage (Vbl) may be about 1V. Vread is a voltage that is large enough to turn on the transistors such as about 6.5V. Vcelsrc may be about 0.6V. As one example, Vev_L may be about-0.5V and Vev_H may be about-0.1V.

Step 918 includes a determination of whether erase has passed. In some embodiments, erase may end when all but a few NAND strings have a Vt below Vev_L. If so, then the erase procedure ends in step 920 with a status of pass. However, for the sake of discussion it will be assumed that erase has not passed with the first erase loop.

Step 922 includes placing the bit lines into different groups based on the erase statues of the NAND strings connected to the respective bit line. In one embodiment the three groups are: normal erase, slow erase, and inhibit erase. Step 924 includes stepping up the normal erase voltage and incrementing the erase loop count. After process 900 another erase loop may be performed.

Figure 11:
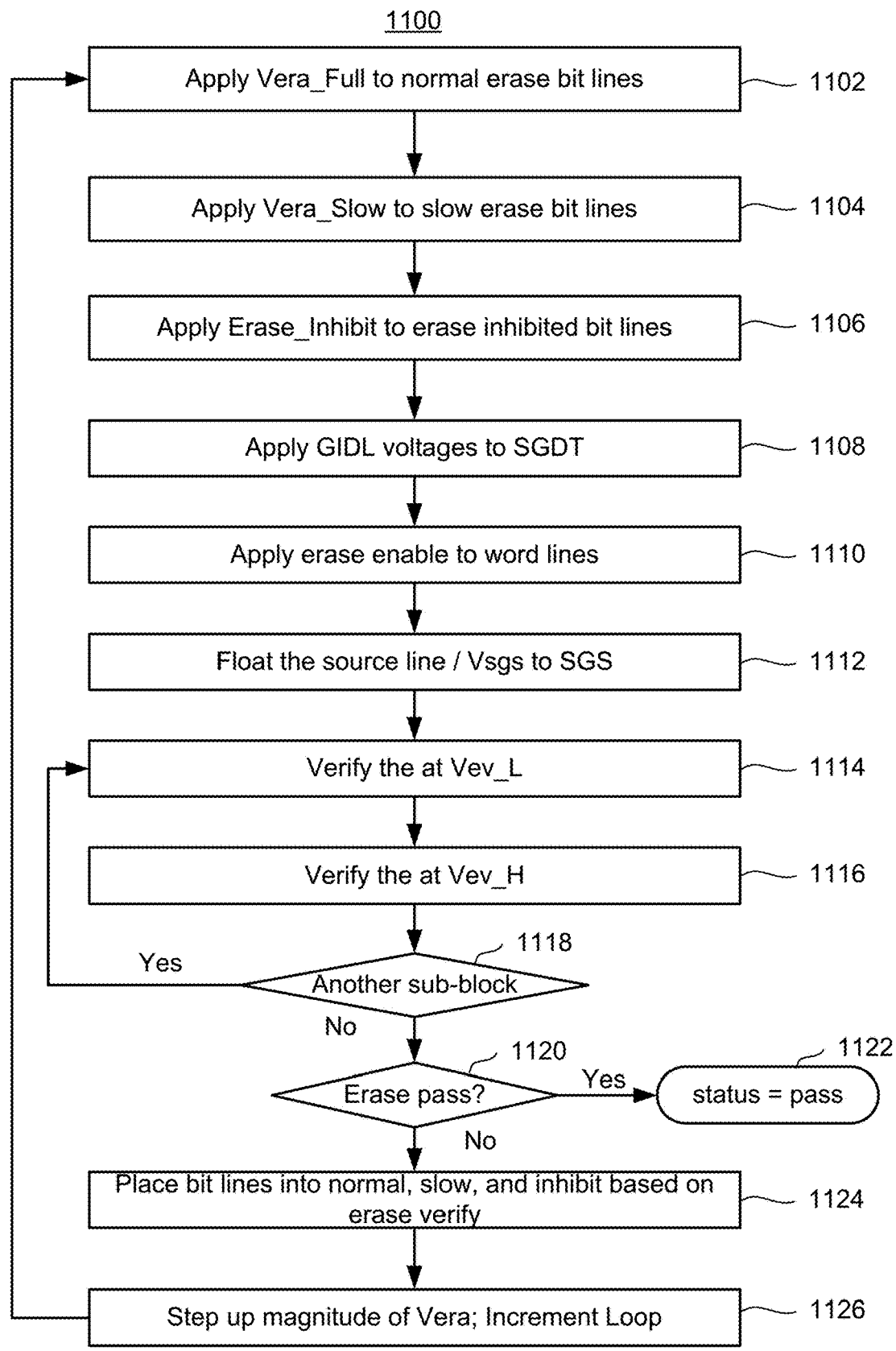
FIG. 11 is a flowchart describing one embodiment of a second and further loops of a multi-loop GIDL based erase procedure.

FIG. 11 is a flowchart describing one embodiment of a second and further loops of a multi-loop GIDL based erase procedure. The process 1100 in FIG. 11 may be performed after performing the first erase loop in FIG. 9. Step 1102 includes applying a normal erase voltage (Vera_full) to the bits lines in the normal erase group. Step 1104 includes applying a slow erase voltage (Vera_slow) to the bits lines in the slow erase group. Step 1106 includes applying an erase inhibit voltage (Erase_Inhibit) to the bits lines in the erase inhibit group.

Step 1108 includes applying a GIDL voltage to transistors adjacent to the bit lines (e.g., SGDT). The difference in voltage between Vera_full and the GIDL voltage will generate a large GIDL current at the drain end of the NAND strings connected to the bit lines in the normal erase group. The difference in voltage between Vera_slow and the GIDL voltage will generate a smaller GIDL current at the drain end of the NAND strings connected to the bit lines in the slow erase group. The difference in voltage between Erase_inhibit and the GIDL voltage will not generate GIDL current in the NAND strings connected to the bit lines in the erase inhibit group.

Step 1110 includes applying an erase enable voltage to the word lines in the erase group. In one embodiment, the erase enable voltage is about 0.5V but could be higher or lower. Note that the erase enable voltage only enables erase if the channel of the memory cell at a suitable voltage. Thus, the erase enable voltage will not result in erase of the memory cells on NAND strings connected to the bit lines in the erase inhibit group.

Step 1112 includes floating the source line. Step 1112 also includes applying a select voltage to source side select lines (e.g., SGS).

Figure 12:
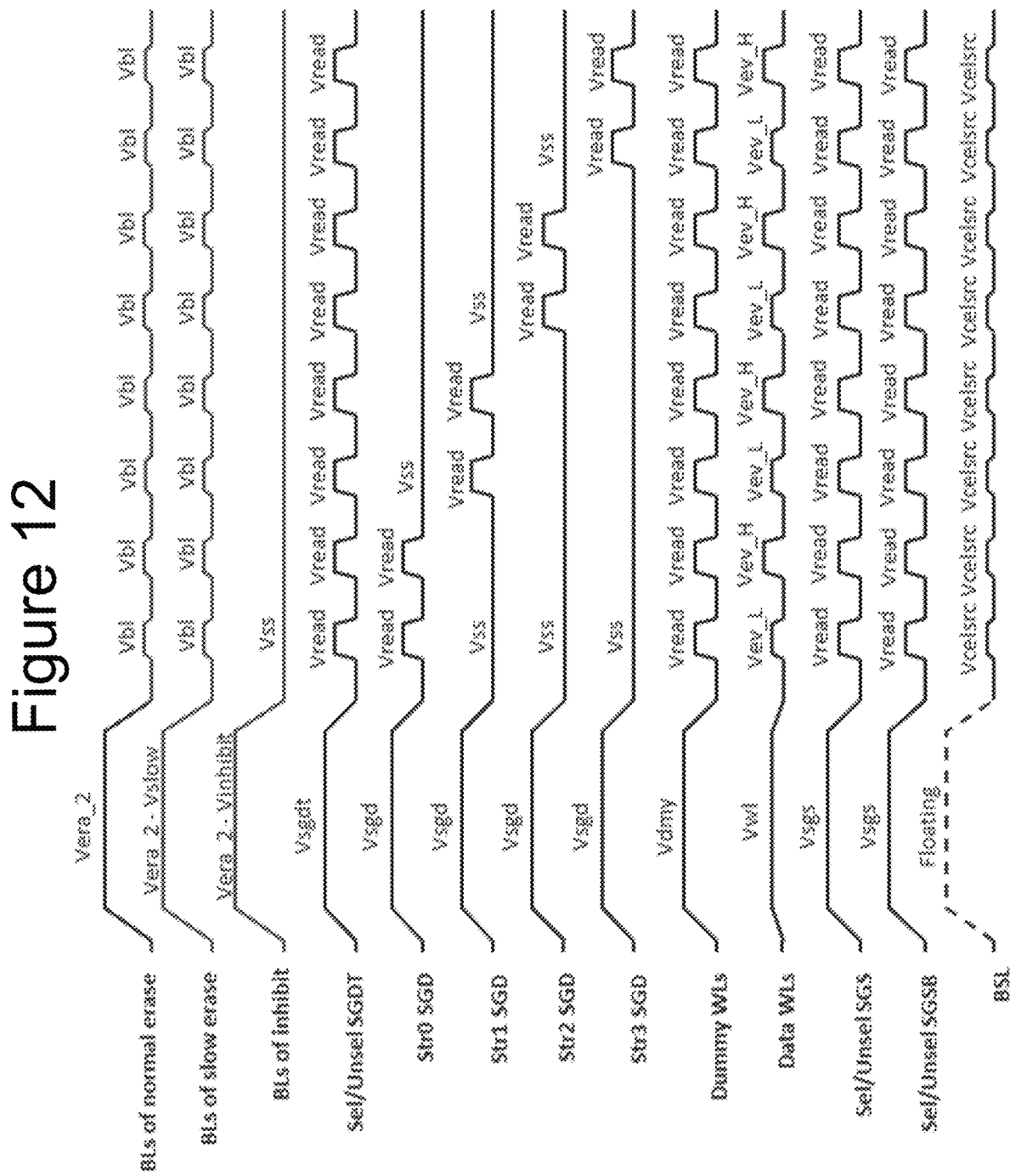
FIG. 12 depicts a timing diagram of voltages applied to various control lines during an embodiment of the second erase loop.

FIG. 12 depicts a timing diagram of voltages applied to various control lines during an embodiment of the second erase loop. The control lines correspond to the example architecture depicted in FIGS. 4B, 4C, and 4D. In the second erase loop, the bit lines for normal erase have Vera_2 applied thereto. Vera_2 may be about 0.5V or so larger than Vera_1. An example of Vera_2 is 18V. In the second erase loop, the bit lines for slow erase have Vera_2–Vslow applied thereto. Vslow may be about 1V. Thus, the voltage applied to the slow erase bit lines may be about 1V less than Vera_2. In the second erase loop, the bit lines for erase inhibit have Vera_2–Vinhibit applied thereto. Vinhibit may be about 7.6V. Thus, the voltage applied to the inhibited bit lines may be about 7.6V less than Vera_2. The voltages to the remaining control lines depicted in FIG. 12 may be the same as for the corresponding control lines depicted in FIG. 10.

The voltages result in a large GIDL current in the SGDT transistors at the drain end (adjacent to the bit lines) of the NAND strings connected to the normal erase bit lines. The voltages result in a smaller GIDL current (relative to the normal case) in the SGDT transistors at the drain end (adjacent to the bit lines) of the NAND strings connected to the slow erase bit lines. Moreover, the normal erase bit lines have a higher voltage than the slow erase bit lines. Therefore, the memory cells on the NAND strings connected to the slow erase bit lines will erase at a slower speed than the memory cells on the NAND strings connected to the normal erase bit lines. GIDL current is not generated in the NAND strings connected to the erase inhibit bit lines.

Referring now to the erase verify portion of FIG. 11, step 1114 includes verifying the NAND strings with respect to a low erase verify level (e.g., Vev_L). Step 1116 includes verifying the NAND strings with respect to a high erase verify level (Vev_H). Step 1118 is a determination of whether there is another sub-block to verify. Note that steps 1114 and 1116 are performed on a NAND string basis. FIG. 12 shows the timing of voltages applied to the control lines during erase verify. The bit line voltage (Vbl) for the normal group bit lines and the slow erase bit lines may be about 1V (e.g., the same as in FIG. 10). However, the bit line voltage for the bit lines in the erase inhibit group may be grounded (e.g., Vss), which saves power. The voltages to the remaining control lines depicted in FIG. 12 for the erase verify may be the same as for the corresponding control lines depicted in FIG. 10.

Step 1120 includes a determination of whether erase has passed. In some embodiments, erase may end when all but a few NAND strings have a Vt below Vev_L. If so, then the erase procedure ends in step 1122 with a status of pass. In the event that erase has not yet passed, then step 1124 may be performed. Step 1124 includes placing the bit lines into different groups based on the erase status of the NAND strings connected to the bit line. Step 1124 may be similar to step 922 in FIG. 9. Step 1126 includes stepping up the normal erase voltage and incrementing the erase loop count. After step 1126 another erase loop may be performed by returning to step 1102.

FIG. 13 is a flowchart of one embodiment of a process 1300 that shows further details of placing bit lines into different erase groups. Process 1300 has a number of loops, with each loop processing one sub-block. Step 1302 includes applying a select voltage (e.g., Vread) to the selected SGD (e.g., the SGD in the selected sub-block). Step 1304 includes applying an unselect voltage (e.g., Vss) to unselected SGD (e.g., the SGD in the unselected sub-blocks). Note that the SGDT lines may have Vread applied thereto (see FIGS. 10 and 12).

Step 1306 includes applying an erase verify voltage low voltage to word lines in the selected block. In one embodiment, the erase verify voltage is applied to all data word lines in the selected block. However, in an embodiment such as erase of one tier, the erase verify voltage is only applied to word lines in the tier being erased. Other words lines in the block may have a pass voltage applied thereto. The pass voltage has a higher magnitude than the Vt of any of the memory cells connected to these other word lines. Step 1308 includes sensing the bit lines. Step 1308 may sense the current in each respective bit line. In an embodiment, the R/W circuits 225 are used to sense the bit line current. Step 1310 includes storing an erase low status for each NAND string in the selected sub-block.

Step 1312 includes applying an erase verify high voltage to word lines in the selected block. The erase verify high voltage should be applied to the same word lines to which the erase verify low voltage was applied in step 1306. Other words lines in the block may have a pass voltage applied thereto. Step 1314 includes sensing the bit lines. Step 1314 may sense the current in each respective bit line. In an embodiment, the R/W circuits 225 are used to sense the bit line current. Step 1316 includes storing an erase high status for each NAND string in the selected sub-block.

Step 1318 is a determination of whether there is another sub-block to process. If so, the memory system will return to step 1302 to process the next sub-block. When the erase status for all NAND strings in the block has been collected step 1320 may be performed. Step 1320 includes the bit lines are placed into the normal, slow, or inhibit groups based on the erase status of the NAND strings connected to the bit line. In an embodiment, if at least one NAND string connected to a bit line has a Vt above the higher erase verify level then the bit line is placed in the normal erase group; if all NAND strings connected to a bit line have a Vt below the final target erase verify level then the bit line is placed in the erase inhibit group; and if all NAND strings connected to a bit line have a Vt below the higher erase verify level but at least one NAND string has Vt above the final target erase verify level then the bit line is placed in the slow erase group.

In view of the foregoing, an embodiment includes an apparatus comprising a control circuit configured to connect to a memory structure having NAND strings having memory cells. The control circuit is configured to apply a first erase voltage to a plurality of bit lines during a first erase loop. Each bit line is connected to a group of NAND strings being erased. The bit lines include a first bit line connected to a first group of NAND strings being erased and a second bit line connected to a second group of NAND strings being erased. The control circuit is configured to verify each NAND string being erased in the first erase loop with respect to a first erase verify level and a second erase verify level that has a greater magnitude than the first erase verify level. The control circuit is configured to, responsive to a determination that at least one NAND string in the first group has a threshold voltage (Vt) above the second erase verify level and that all NAND strings in the second group have a Vt below the second erase verify level but at least one NAND string in the second group has a Vt above the first erase verify level, apply a second erase voltage to the first bit line and a third erase voltage to the second bit line in a second erase loop that immediately follows the first erase loop. The third erase voltage has a lower magnitude than the second erase voltage.

In a further embodiment, the second erase voltage erases the memory cells in NAND strings in the first group at a first speed, and the third erase voltage erases the memory cells in NAND strings in the second group at a second speed that is slower than the first speed.

In a further embodiment, the control circuit is further configured to, responsive to a determination that all NAND strings in a third group of NAND strings connected to a third bit line of the plurality of bit lines have a Vt below the first erase verify voltage responsive to the first erase voltage, apply an erase inhibit voltage to the third bit line in the second erase loop while applying the second erase voltage to the first bit line and the third erase voltage to the second bit line. The erase inhibit voltage inhibits erase of the memory cells in the third group of NAND strings.

In a further embodiment, the control circuit is further configured to apply a gate voltage to gates of transistors on the second group of NAND strings and the third group of NAND strings while applying the third erase voltage to the second bit line and while applying the erase inhibit voltage to the third bit line. A first voltage difference between the third erase voltage and the gate voltage generates a gate induced drain leakage (GIDL) current in the NAND strings in the second group. A second voltage difference between the erase inhibit voltage and the gate voltage results in no GIDL current in the NAND strings in the third group.

In a further embodiment, the control circuit is further configured to apply the gate voltage to gates of transistors on the first group of NAND strings while applying the second erase voltage to the first bit line. A third voltage difference between the second erase voltage and the gate voltage generates a GIDL current in the NAND strings in the first group that is greater than the GIDL current in the NAND strings in the second group.

In a further embodiment, the control circuit is further configured to apply a gate voltage to gates of transistors on the first group of NAND strings and the second group of NAND strings while applying the second erase voltage to the first bit line and while applying the third erase voltage to the second bit line. A first voltage difference between the second erase voltage and the gate voltage generates a first amount of GIDL current in the NAND strings in the first group. A second voltage difference between the third erase voltage and the gate voltage generates a second amount of GIDL current in the NAND string in the second group. The second amount of GIDL current being less than the first amount of GIDL current.

In a further embodiment, the control circuit is further configured to place each bit line into either a normal erase group, a slow erase group, or an erase inhibit group based on verifying each NAND string in the first erase loop with respect to the first erase verify level and the second erase verify level.

In a further embodiment, the first erase verify level is a final target erase level.

In a further embodiment, the second erase voltage has a greater magnitude than the first erase voltage.

In a further embodiment, the third erase voltage has a lower magnitude than the first erase voltage.

An embodiment includes a method for operating memory. The method comprises applying a first erase pulse to a first bit line connected to a first group of NAND strings having memory cells and also to a second bit line connected to a second group of NAND strings having memory cells. The method comprises verifying each NAND string in the first group and each NAND string in the second group with respect to a final target erase verify voltage and an erase high verify voltage greater than the final target erase verify voltage in response to applying the first erase pulse to the first bit line and to the second bit line. The method comprises applying a second erase pulse to the first bit line responsive to at least one NAND string in the first group failing erase with respect to the erase high verify voltage while applying a third erase pulse to the second bit line responsive to all NAND strings in the second group passing erase with respect to the erase high verify voltage but at least one NAND string in the second group failing erase with respect to the final target erase verify voltage. The second erase pulse erases the memory cells in the NAND strings in the first group at a first speed and the third erase pulse erases the memory cells in the NAND strings in the second group at a second speed that is slower than the first speed.

An embodiment includes a non-volatile storage system comprising a three-dimensional memory structure having blocks comprising NAND strings. The memory structure has a plurality of bit lines connected to the NAND strings. Each block has multiple sub-blocks with each sub-block containing a different group of NAND strings. Each bit line connects to one NAND string in each sub-block. The non-volatile storage system comprises a control circuit in communication with the memory structure. The control circuit is configured to apply a first erase voltage to the plurality of bit lines while applying a gate induced drain leakage (GIDL) voltage to a select line connected to NAND strings in a selected block to generate a GIDL current in the NAND strings in the selected block. The select line is adjacent to the bit lines. The control circuit is configured to verify each NAND string in the block with respect to a target erase verify voltage and a high erase verify voltage in response to applying the first erase voltage to the plurality of bit lines while applying the GIDL voltage to the select line. The high erase verify voltage is greater than the target erase verify voltage. The control circuit is configured to place each bit line of the plurality of bit lines into one of a normal erase group, a slow erase group, and an erase inhibit group based on verifying each NAND string in the block at the target erase verify voltage and the high erase verify voltage.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
a control circuit configured to connect to a memory structure having NAND strings having memory cells, the control circuit configured to:
apply a first erase voltage to a plurality of bit lines during a first erase loop, wherein each bit line is connected to a group of NAND strings being erased, the bit lines include a first bit line connected to a first group of NAND strings being erased and a second bit line connected to a second group of NAND strings being erased;
verify each NAND string being erased in the first erase loop with respect to a first erase verify level and a second erase verify level that has a greater magnitude than the first erase verify level; and
responsive to a determination that at least one NAND string in the first group has a threshold voltage (Vt) above the second erase verify level and that all NAND strings in the second group have a Vt below the second erase verify level but at least one NAND string in the second group has a Vt above the first erase verify level:
apply a second erase voltage to the first bit line and a third erase voltage to the second bit line in a second erase loop that immediately follows the first erase loop, wherein the third erase voltage has a lower magnitude than the second erase voltage.

2. The apparatus of claim 1, wherein:
the second erase voltage erases the memory cells in NAND strings in the first group at a first speed; and
the third erase voltage erases the memory cells in NAND strings in the second group at a second speed that is slower than the first speed.

3. The apparatus of claim 1, wherein the control circuit is further configured to:
responsive to a determination that all NAND strings in a third group of NAND strings connected to a third bit line of the plurality of bit lines have a Vt below the first erase verify voltage-level responsive to the first erase voltage:
apply an erase inhibit voltage to the third bit line in the second erase loop while applying the second erase voltage to the first bit line and the third erase voltage to the second bit line, wherein the erase inhibit voltage inhibits erase of the memory cells in the third group of NAND strings.

4. The apparatus of claim 3, wherein the control circuit is further configured to:
apply a gate voltage to gates of transistors on the second group of NAND strings and the third group of NAND strings while applying the third erase voltage to the second bit line and while applying the erase inhibit voltage to the third bit line, wherein:
a first voltage difference between the third erase voltage and the gate voltage generates a gate induced drain leakage (GIDL) current in the NAND strings in the second group; and
a second voltage difference between the erase inhibit voltage and the gate voltage results in no GIDL current in the NAND strings in the third group.

5. The apparatus of claim 4, wherein the control circuit is further configured to:
apply the gate voltage to gates of transistors on the first group of NAND strings while applying the second erase voltage to the first bit line, wherein:
a third voltage difference between the second erase voltage and the gate voltage generates a GIDL current in the NAND strings in the first group that is greater than the GIDL current in the NAND strings in the second group.

6. The apparatus of claim 1, wherein the control circuit is further configured to:
apply a gate voltage to gates of transistors on the first group of NAND strings and the second group of NAND strings while applying the second erase voltage to the first bit line and while applying the third erase voltage to the second bit line, wherein:
a first voltage difference between the second erase voltage and the gate voltage generates a first amount of GIDL current in the NAND strings in the first group; and
a second voltage difference between the third erase voltage and the gate voltage generates a second amount of GIDL current in the NAND string in the second group, the second amount of GIDL current being less than the first amount of GIDL current.

7. The apparatus of claim 1, wherein the control circuit is further configured to:
place each bit line into either a normal erase group, a slow erase group, or an erase inhibit group based on verifying each NAND string in the first erase loop with respect to the first erase verify level and the second erase verify level.

8. The apparatus of claim 1, wherein the first erase verify level is a final target erase level.

9. The apparatus of claim 1, wherein the second erase voltage has a greater magnitude than the first erase voltage.

10. The apparatus of claim 1, wherein the third erase voltage has a lower magnitude than the first erase voltage.

11. A method for operating memory, the method comprising:
applying a first erase pulse to a first bit line connected to a first group of NAND strings having memory cells and also to a second bit line connected to a second group of NAND strings having memory cells;
verifying each NAND string in the first group and each NAND string in the second group with respect to a final target erase verify voltage and an erase high verify voltage greater than the final target erase verify voltage in response to applying the first erase pulse to the first bit line and to the second bit line; and
applying a second erase pulse to the first bit line responsive to at least one NAND string in the first group failing erase with respect to the erase high verify voltage while applying a third erase pulse to the second bit line responsive to all NAND strings in the second group passing erase with respect to the erase high verify voltage but at least one NAND string in the second group failing erase with respect to the final target erase verify voltage, wherein the second erase pulse erases the memory cells in the NAND strings in the first group at a first speed and the third erase pulse erases the memory cells in the NAND strings in the second group at a second speed that is slower than the first speed.

12. The method of claim 11, further comprising:
applying the first erase pulse to a third bit line connected to a third group of NAND strings having memory cells while applying the first erase pulse to the first bit line and to the second bit line;
verifying each NAND string in the third group with respect to the final target erase verify voltage and the erase high verify voltage in response to applying the first erase pulse to the third bit line; and applying an erase inhibit voltage to the third bit line responsive to all NAND strings in the third group passing erase with respect to the final target erase verify voltage, wherein the erase inhibit voltage inhibits erase of the memory cells in the third group of NAND strings, wherein the erase inhibit voltage is applied to the third bit line while applying the second erase pulse to the first bit line and while applying the third erase pulse to the second bit line.

13. The method of claim 12, further comprising:

applying a gate induced drain leakage (GIDL) voltage to gates of transistors on the second group of NAND strings that are adjacent to the second bit line while applying the third erase pulse to the second bit line; and applying the GIDL voltage to gates of transistors on the third group of NAND strings that are adjacent to the third bit line while applying the erase inhibit voltage to the third bit line, wherein:

a first voltage difference between the third erase pulse and the GIDL voltage generates a GIDL current in the NAND strings in the second group to erase the memory cells in the NAND strings in the second group at the second speed; and a second voltage difference between the erase inhibit voltage and the GIDL voltage does not generate GIDL current in the NAND strings in the third group in order to inhibit erase in the memory cells in the NAND strings in the third group.

14. The method of claim 11, further comprising:

applying a gate induced drain leakage (GIDL) voltage to gates of transistors on the first group of NAND strings that are adjacent to the first bit line while applying the second erase pulse to the first bit line; and applying the GIDL voltage to gates of transistors on the second group of NAND strings that are adjacent to the second bit line while applying the third erase pulse to the second bit line, wherein:

a first voltage difference between the second erase pulse and the GIDL voltage generates a first amount of GIDL current in the NAND strings in the first group; and a second voltage difference between the third erase pulse and the GIDL voltage generates a second amount of GIDL current in the NAND strings in the second group, the second amount of GIDL current being less than the first amount of GIDL current.

15. A non-volatile storage system comprising:

a three-dimensional memory structure having blocks comprising NAND strings, the memory structure having a plurality of bit lines connected to the NAND strings, wherein each block has multiple sub-blocks with each sub-block containing a different group of NAND strings, each bit line connects to one NAND string in each sub-block; and a control circuit in communication with the memory structure, the control circuit configured to:

apply a first erase voltage to the plurality of bit lines while applying a gate induced drain leakage (GIDL) voltage to a select line connected to NAND strings in a selected block to generate a GIDL current in the NAND strings in the selected block, the select line adjacent to the bit lines;

verify each NAND string in the block with respect to a target erase verify voltage and a high erase verify voltage in response to applying the first erase voltage to the plurality of bit lines while applying the GIDL voltage to the select line, the high erase verify voltage is greater than the target erase verify voltage; and place each bit line of the plurality of bit lines into one of a normal erase group, a slow erase group, and an erase inhibit group based on verifying each NAND string in the block at the target erase verify voltage and the high erase verify voltage.

16. The non-volatile storage system of claim 15, wherein the control circuit is further configured to:

place bits lines of the plurality of bit lines for which no connected NAND strings has a threshold voltage (Vt) above the high erase verify voltage but at least one connected NAND string has a Vt above the target erase verify voltage into the slow erase group.

17. The non-volatile storage system of claim 16, wherein the control circuit is further configured to:

place bits lines of the plurality of bit lines for which at least one connected NAND strings has a Vt above the high erase verify voltage into the normal erase group; and place bits lines of the plurality of bit lines for which all connected NAND strings have a Vt below the target erase verify voltage into the erase inhibit group.

18. The non-volatile storage system of claim 15, wherein the control circuit is further configured to:

apply a second erase voltage to the bit lines in the normal erase group while applying a third erase voltage to the bit lines in the slow erase group while applying an erase inhibit voltage to the bit lines in the erase inhibit group while applying the GIDL voltage to the select line connected to the NAND strings in the selected block, wherein the second erase voltage is greater than the third erase voltage, and the third erase voltage is greater than the erase inhibit voltage.

19. The non-volatile storage system of claim 18, wherein:

the second erase voltage erases memory cells on NAND strings connected to the bit lines in the normal erase group at a first speed;

the third erase voltage erases memory cells on NAND strings connected to the bit lines in the slow erase group at a second speed that is slower than the first speed; and the erase inhibit voltage inhibits erase of memory cells on NAND strings connected to the bit lines in the erase inhibit group.

20. The non-volatile storage system of claim 19, wherein:

the second erase voltage in combination with the GIDL voltage generates a first amount of GIDL current in the NAND strings connected to the bit lines in the normal erase group;

the third erase voltage in combination with the GIDL voltage generates a second amount of GIDL current in the NAND strings connected to the bit lines in the slow erase group; and the erase inhibit voltage in combination with the GIDL voltage does not generate any GIDL current in the NAND strings connected to the bit lines the erase inhibit group to thereby inhibit erase.

* * * * *